(12) United States Patent
Rompel et al.

(10) Patent No.: US 11,541,498 B2
(45) Date of Patent: Jan. 3, 2023

(54) COLLAR SYSTEM FOR A DUST EXTRACTOR

(71) Applicant: Black & Decker Inc., New Britain, CT (US)

(72) Inventors: Markus Rompel, Runkel/Schadeck (DE); Krystof Petele, Decin (CZ); Arthur Lauer, Frankfurt am Main (DE); Andreas Friedrich, Limburg (DE); Clemens Duenser, Mainz (DE)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/715,341

(22) Filed: Dec. 16, 2019

(65) Prior Publication Data
US 2021/0001441 A1 Jan. 7, 2021

(30) Foreign Application Priority Data
Jul. 2, 2019 (GB) ..................................... 1909531

(51) Int. Cl.
*B23Q 11/00* (2006.01)
*B23B 35/00* (2006.01)
*B25D 17/20* (2006.01)

(52) U.S. Cl.
CPC .......... *B23Q 11/0046* (2013.01); *B23B 35/00* (2013.01); *B25D 17/20* (2013.01); *B25D 2217/0057* (2013.01)

(58) Field of Classification Search
CPC ............ B23B 2270/30; B23B 2270/62; B23B 2251/68; B23B 2260/118;
(Continued)

(56) References Cited

U.S. PATENT DOCUMENTS 2,041,689 A * 5/1936 Baumeister ........... E21B 21/015
175/135
4,813,462 A * 3/1989 Linn .................. B23Q 11/0046
141/65

(Continued)

FOREIGN PATENT DOCUMENTS

DE 29705797 U1 6/1997
DE 102005062888 A1 7/2007
(Continued)

OTHER PUBLICATIONS

Machine Translation, DE102005062888A1. (Year: 2007).*
(Continued)

*Primary Examiner* — Chwen-Wei Su
(74) *Attorney, Agent, or Firm* — Amir R. Rohani

(57) ABSTRACT

A collar system for a dust extractor is provided including: a collar including a drill passage extending through the collar and an extension forming an internal passage that connects at one end with the drill passage, the extension being attachable to a housing of the dust extractor to enable the internal passage to connect to a suction passage of the dust extractor; and a cover mounted adjacent an entrance of the drill passage, the cover being moveable between a first position where it covers the entrance and a second position where is remote from the entrance, wherein the cover comprises at least hole that passes through the cover.

17 Claims, 32 Drawing Sheets

(58) Field of Classification Search
CPC .............. B23B 2260/058; B23B 47/34; B23Q 11/0071; B23Q 11/0075; B23Q 11/0042; B23Q 11/0046; B23Q 11/005; B23Q 11/006; B25D 17/20; B25D 2217/0057; Y10T 408/50
See application file for complete search history.

(56) References Cited

U.S. PATENT DOCUMENTS

| | | | |
|---|---|---|---|
| 6,053,674 A * | 4/2000 | Thompson | B23Q 11/0046 175/209 |
| 7,425,109 B2 * | 9/2008 | Simm | B23Q 11/0046 173/198 |
| 7,634,835 B2 | 12/2009 | Bosch | |
| 7,794,184 B2 | 9/2010 | Di Nicolantonio et al. | |
| 7,901,164 B2 | 3/2011 | Skradski et al. | |
| 8,080,077 B1 | 12/2011 | Ellis | |
| 8,113,747 B2 | 2/2012 | Miyanaga | |
| 8,967,922 B2 * | 3/2015 | Yoshikane | B23Q 11/0046 408/67 |
| 9,304,223 B2 * | 4/2016 | DeMaira | G01V 3/08 |
| 9,475,164 B2 | 10/2016 | Simm et al. | |
| 2009/0288682 A1 | 11/2009 | Glogger | |
| 2009/0311058 A1 | 12/2009 | Cañas Fontán | |
| 2011/0142559 A1 | 6/2011 | Hahn | |
| 2013/0149056 A1 | 6/2013 | Appel | |
| 2016/0250731 A1 | 9/2016 | Wong et al. | |
| 2018/0015581 A1 * | 1/2018 | Neale | B23Q 11/0046 |
| 2018/0085873 A1 | 3/2018 | Rompel et al. | |
| 2018/0200852 A1 | 7/2018 | Yoshikane | |

FOREIGN PATENT DOCUMENTS

| | | | |
|---|---|---|---|
| DE | 102006018976 B3 | 11/2007 | |
| DE | 19951479 B4 | 3/2008 | |
| EP | 0799674 A1 | 10/1997 | |
| EP | 1457288 A1 * | 9/2004 | ......... B23Q 11/0046 |
| EP | 1457288 A1 | 9/2004 | |
| EP | 1923174 B1 | 5/2010 | |
| EP | 2067554 B1 | 10/2011 | |
| EP | 2206579 B1 | 2/2012 | |
| EP | 3299120 A2 | 3/2018 | |
| GB | 1576224 A | 10/1980 | |
| JP | 2009202256 A * | 9/2009 | |
| WO | 07080025 A1 | 7/2007 | |
| WO | 15058496 A1 | 4/2015 | |
| WO | 18027246 A2 | 2/2018 | |

OTHER PUBLICATIONS

Machine Translation, JP 2009-202256 A. (Year: 2009).*
GB Search Report dated Jan. 2, 2020 in corresponding GB application No. 1909531.4.
EP EESR dated, Nov. 9, 2020 in corresponding EP application No. 20181540.4.

* cited by examiner

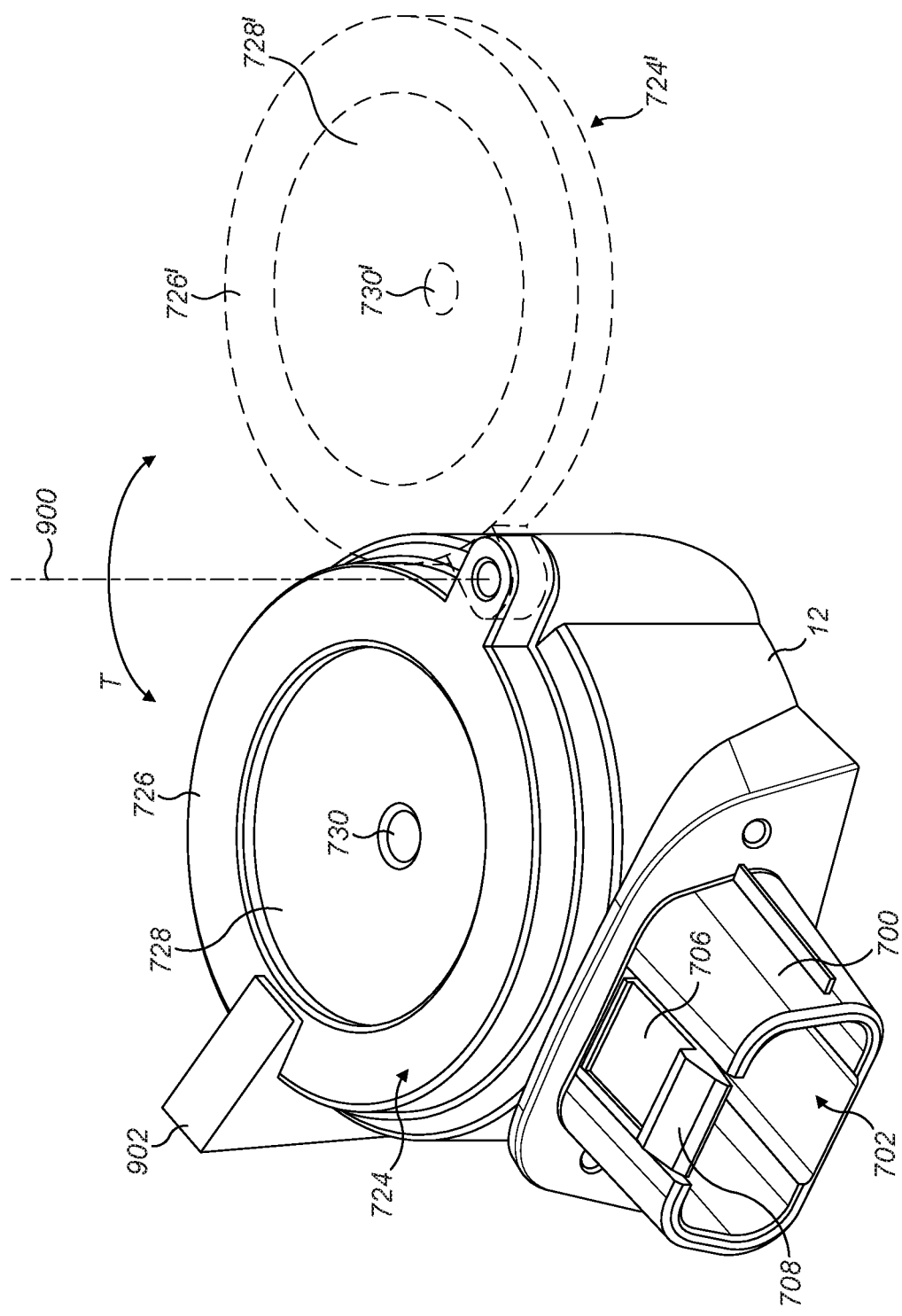

COLLAR SYSTEM FOR A DUST EXTRACTOR

CROSS-REFERENCE TO RELATED APPLICATIONS

This application claims priority, under 35 U.S.C. § 119, to UK Patent Application No. 19 095 31.4 filed Jul. 2, 2019.

FIELD

The present invention relates to a dust extractor for use with a drill, hammer drill or hammer, a system which uses such a dust extractor, and to a method of using such a dust extractor.

BACKGROUND

U.S. Pat. No. 4,205,728, DE202008008561, EP2335869, and EP2474385 all disclose suction cup dust extractors for use with a drill, hammer drill or hammer. Suction cup dust extractors are located on and attached to the surface to be drilled or chiseled by a suction force generated during the operation of the suction cup dust extractor.

EP1245330, EP1459842, DE10 2007000826A1 and EP2174749B1 disclose dust extractors intended to be mounted on and attached to the drill, hammer drill or hammer.

US2009/0288682 discloses a collar system having a collar which comprises a drill passage extending through the collar and an extension forming an internal passage that connects at one end with the drill passage. The extension is capable of attaching to the housing of a dust extractor to enable the internal passage to connect to a suction passage of the dust extractor.

SUMMARY

The present invention aims to provide a system, dust extractor and method for a dust extractor by which any holes created by a drill, hammer drill or hammer whilst using the dust extractor are cleaned.

Accordingly, there is provided a collar system for a dust extractor including a drill passage extending through the collar and an extension forming an internal passage that connects at one end with the drill passage. The extension is capable of attaching to the housing of a dust extractor to enable the internal passage to connect to a suction passage of the dust extractor. In an embodiment, there is provided a moveable cover mounted adjacent an entrance of the drill passage capable of being moved between a first position where it covers the entrance and a second position where is remote from the entrance, wherein the cover comprises a hole passing through the cover.

BRIEF DESCRIPTION OF THE DRAWINGS

Preferred embodiments of the present invention will now be described, by way of example only and not in any limitative sense, with reference to the accompanying drawings in which:

FIG. 31 shows a perspective top view of a collar and pivotal cover in accordance with a second embodiment of the present invention;

DETAILED DESCRIPTION

Figure 1:
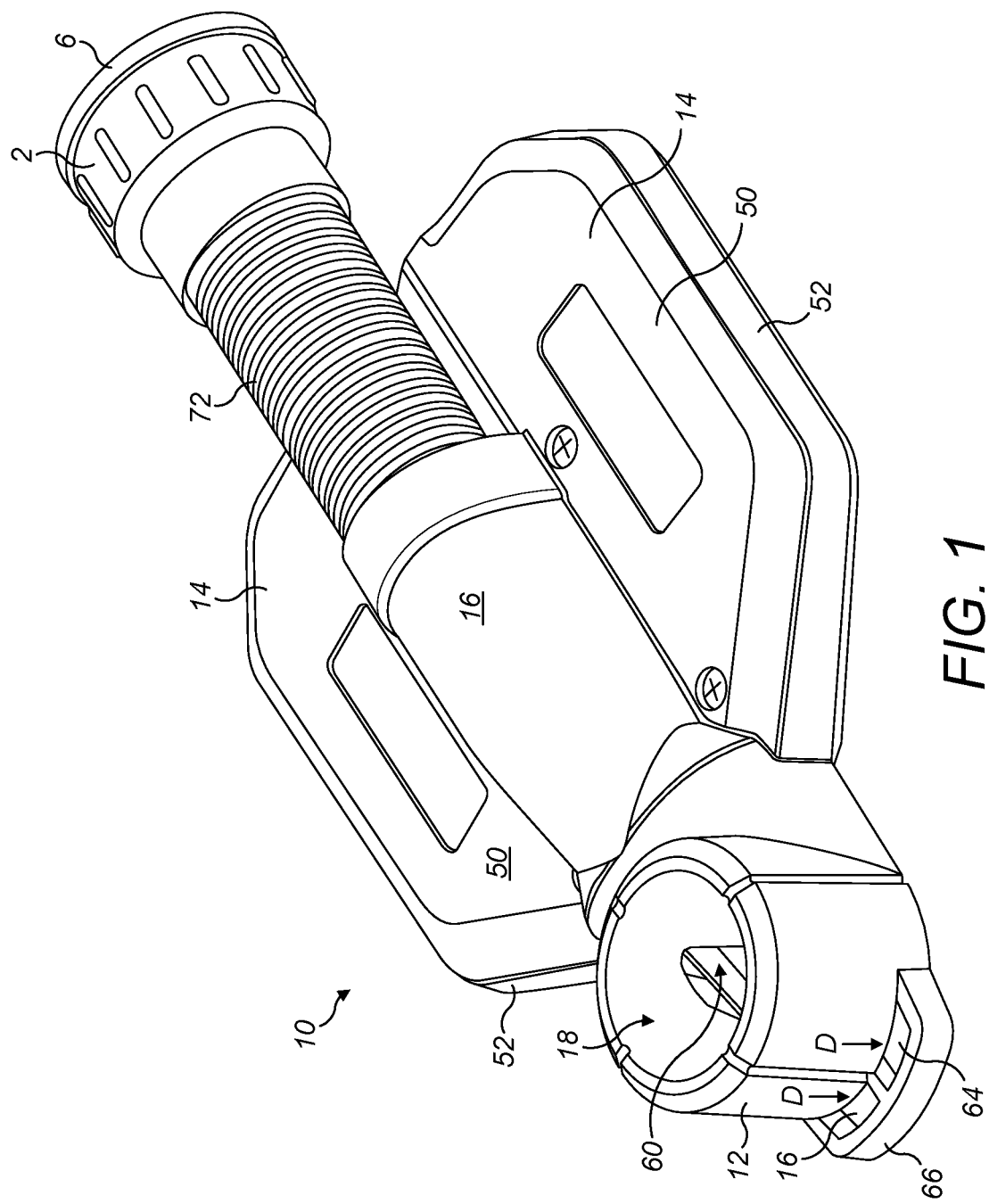
FIG. 1 shows a perspective view of the top of a dust extractor according to an example of a suction cup extractor.
Figure 2:
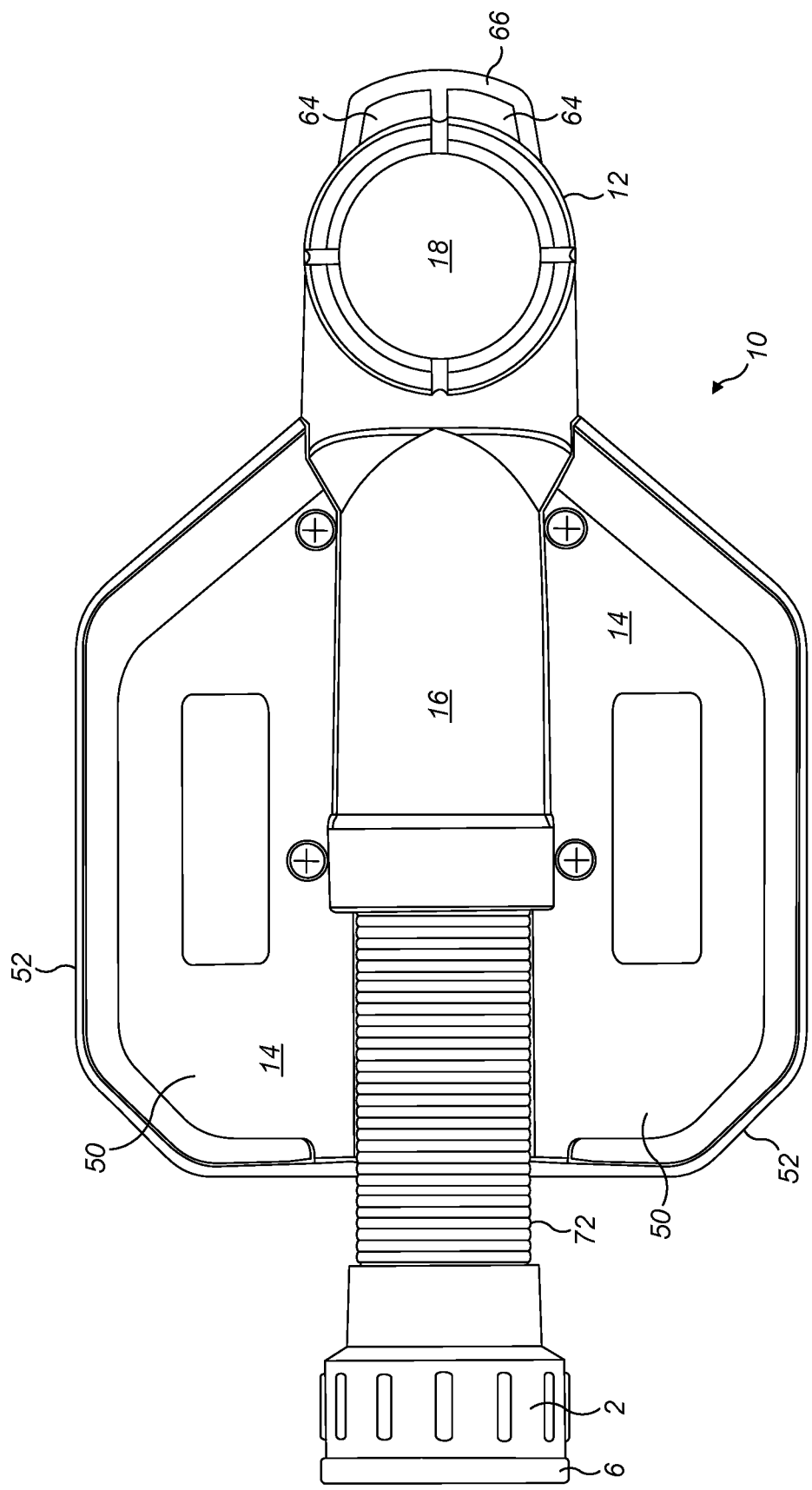
FIG. 2 shows a top view of the suction cup dust extractor.
Figure 3:
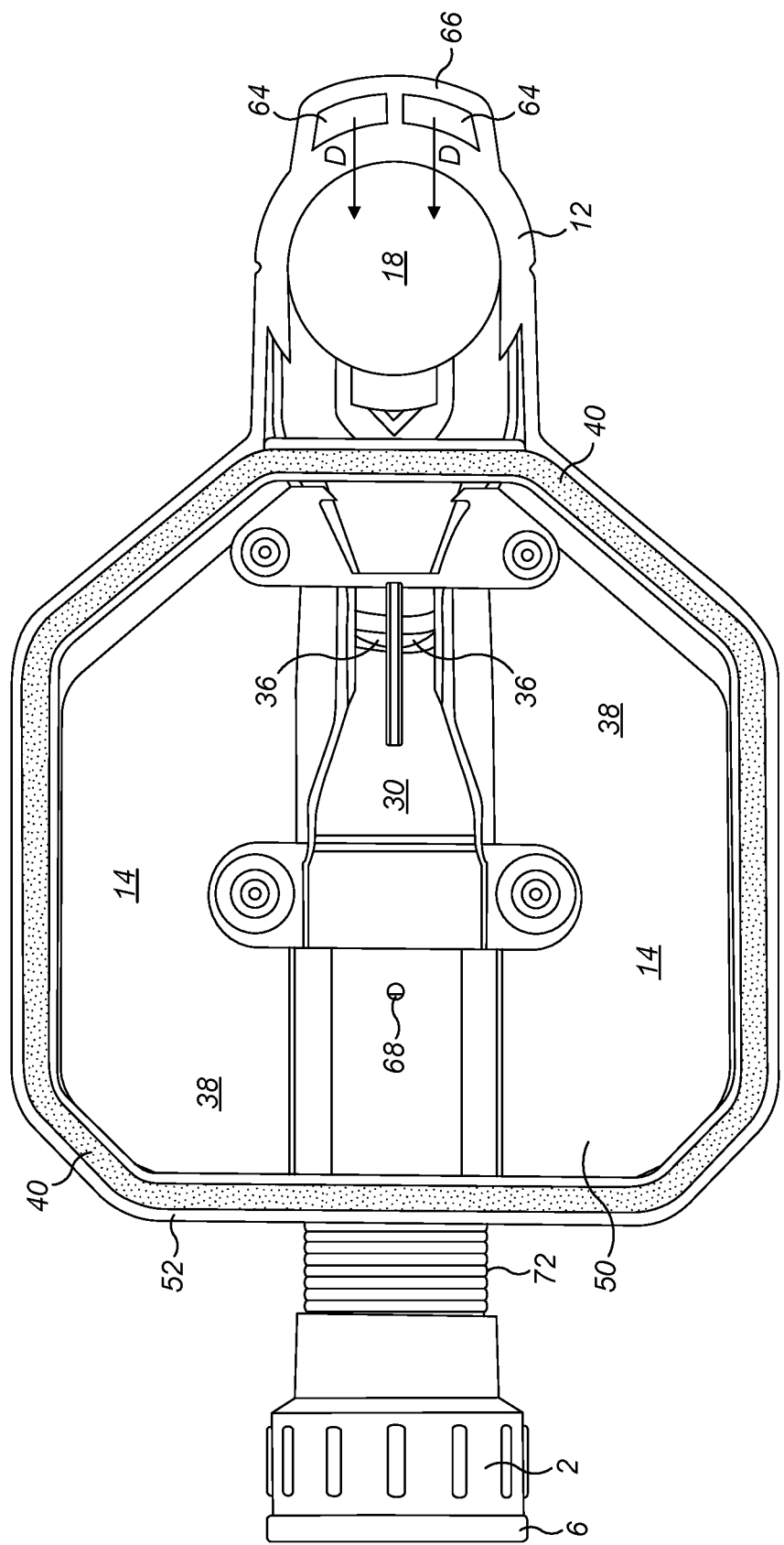
FIG. 3 shows a bottom view of the suction cup dust extractor.
Figure 4:
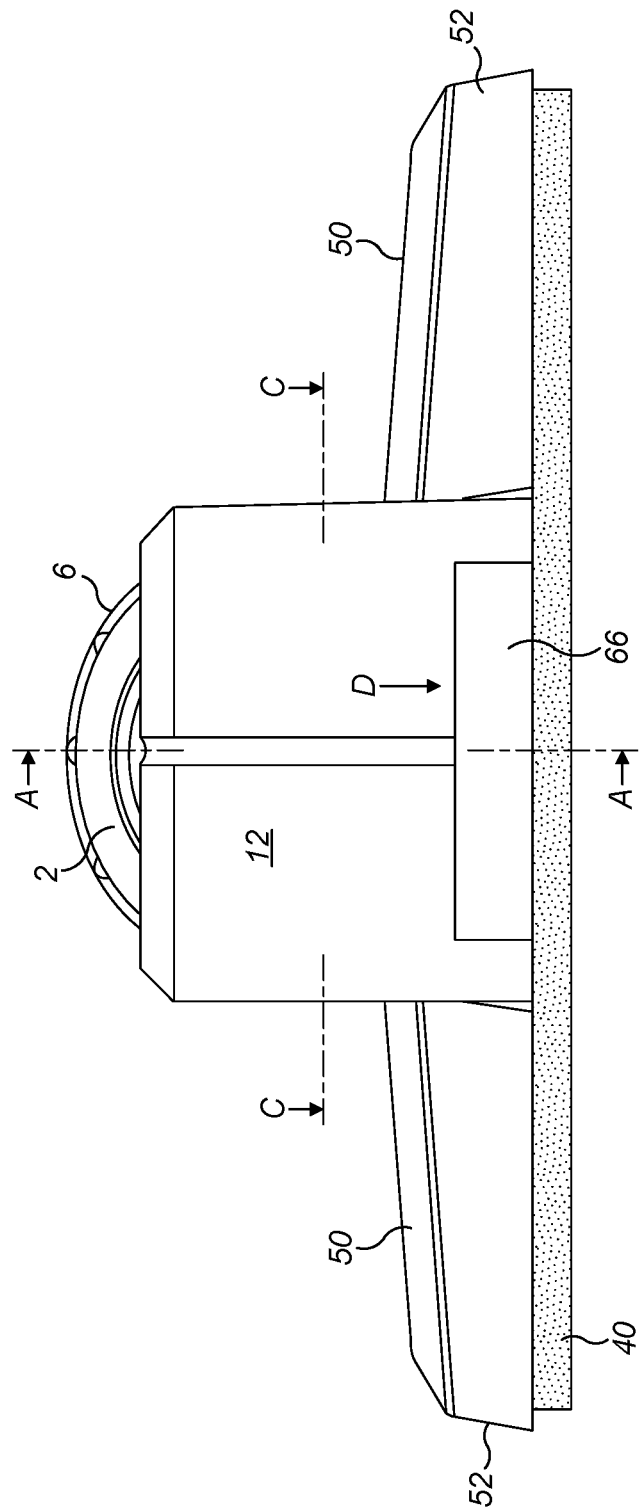
FIG. 4 shows a front view of the suction cup dust extractor.
Figure 5:
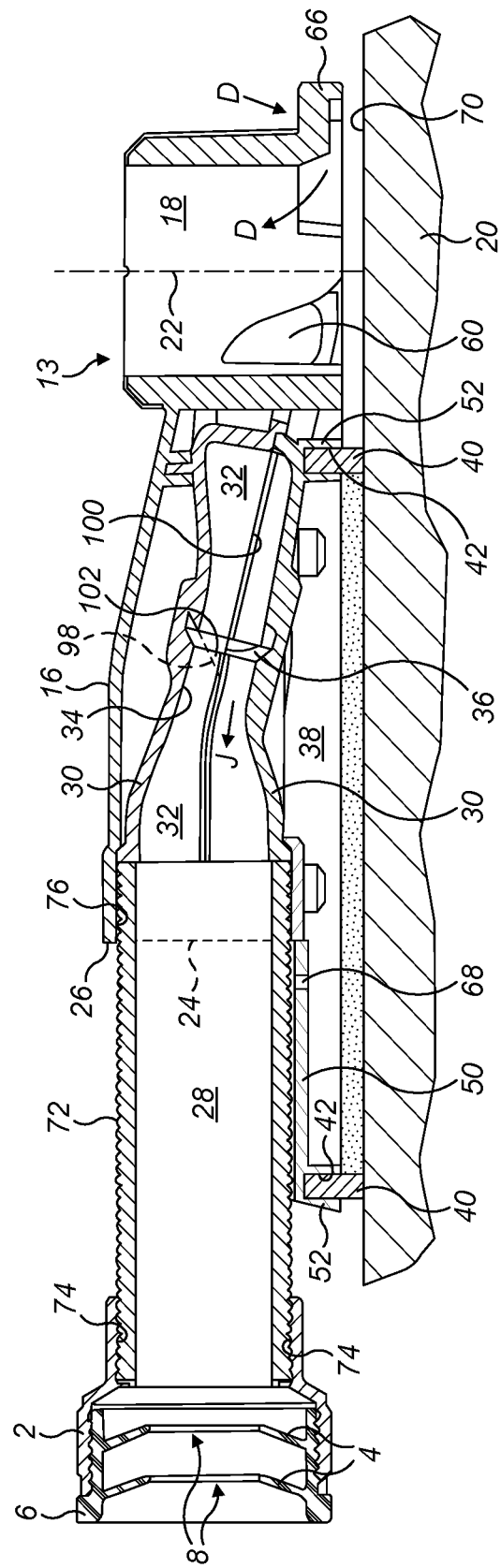
FIG. 5 shows a vertical cross-sectional view of the suction cup dust extractor in the direction of Arrows A in FIG. 4.
Figure 6:
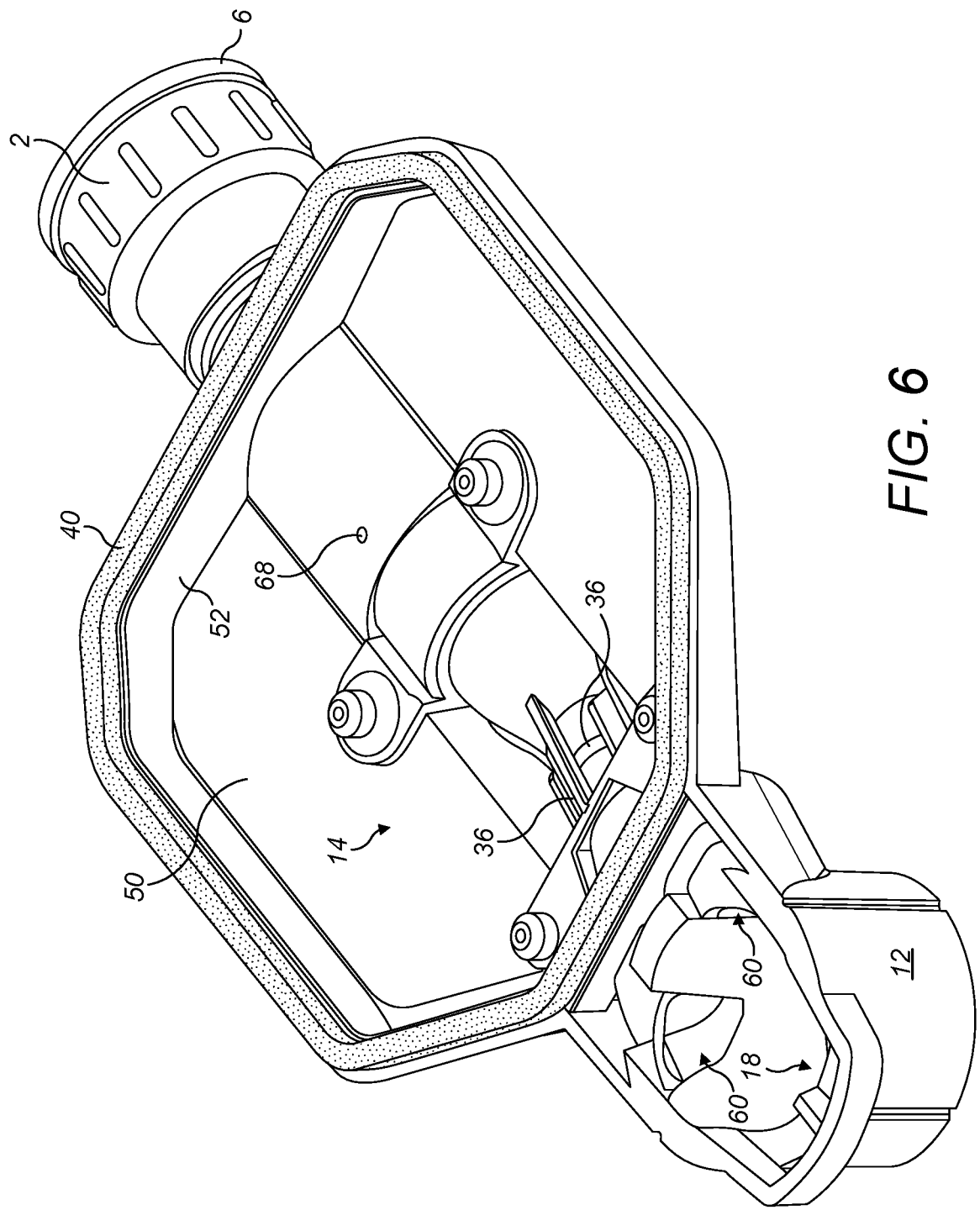
FIG. 6 shows a perspective view of the underside of the suction cup dust extractor.
Figure 7:
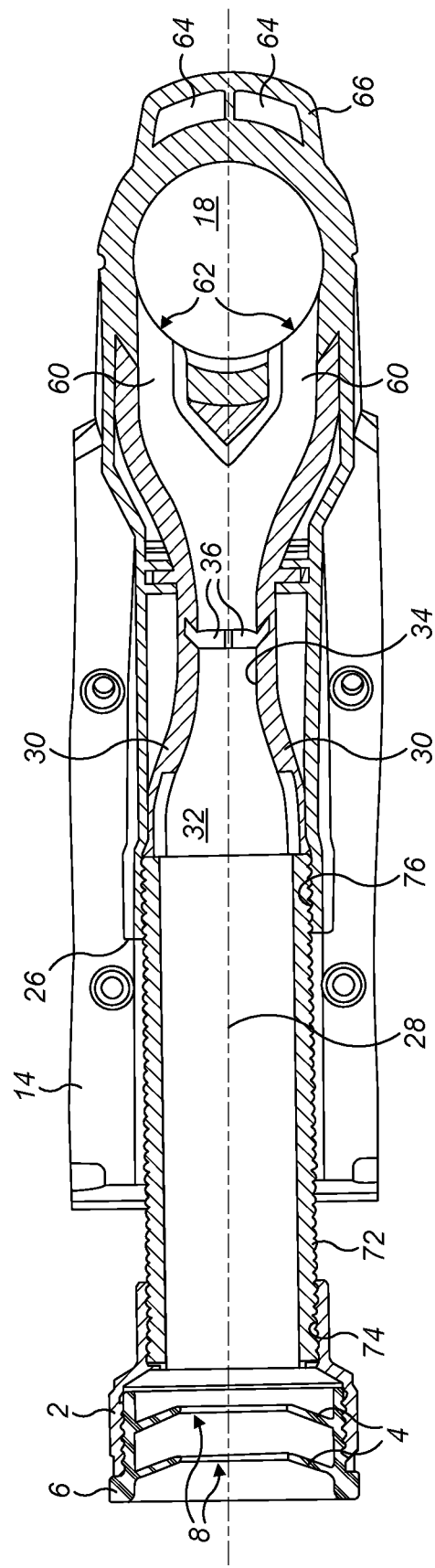
FIG. 7 shows a horizontal cross-sectional view of the suction cup dust extractor in the direction of Arrows C in FIG. 4.
Figure 8:
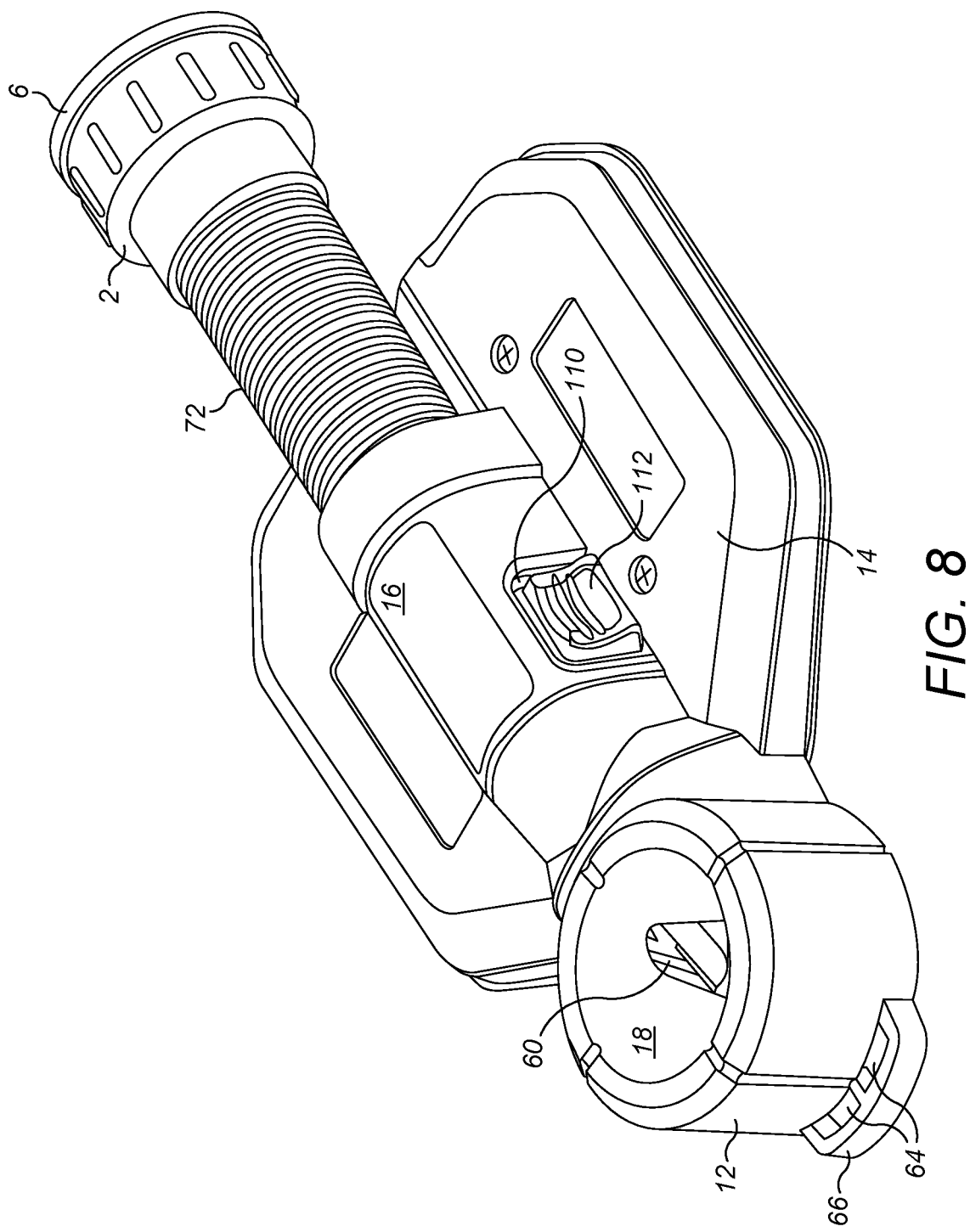
FIG. 8 shows a perspective view of the top of the suction cup dust extractor according to a second example of a suction cup dust extractor.
Figure 9:
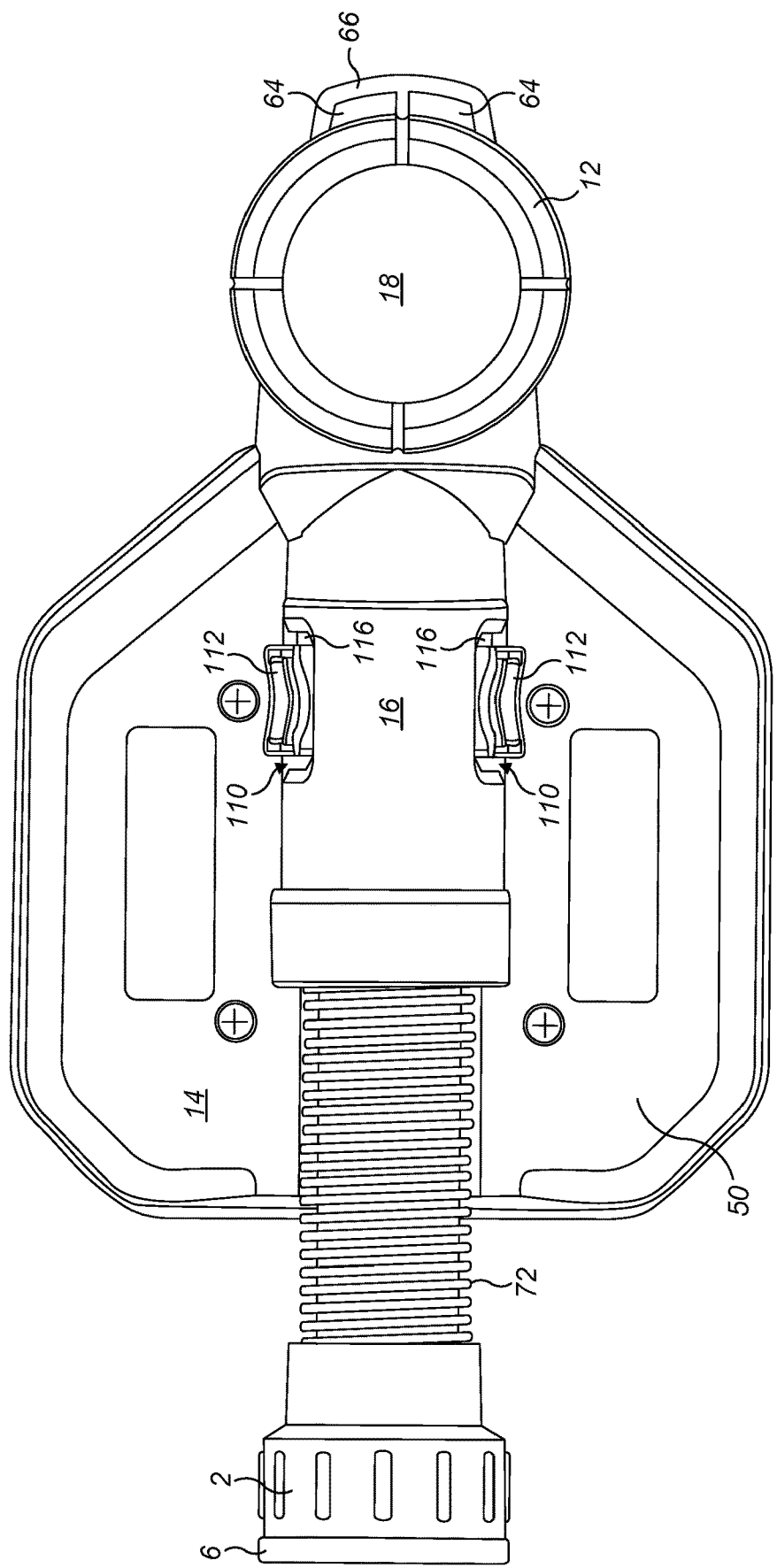
FIG. 9 shows a top view of the suction cup dust extractor.

Two embodiments of the invention will now be described with reference to enclosed drawings.

Whilst the examples and embodiments of the present invention are described in relation to suction cup dust extractors, it will be appreciated that the invention covers all types of dust extractors.

Referring to FIGS. 1 to 7, a first example of a dust extractor will now be described. The dust extractor is a suction cup dust extractor.

The suction cup dust extractor comprises a housing 10 and a drill collar 12 rigidly connected to it at the top end of the housing 10. The housing 10 comprises a skirt 14 with a bridge 16 formed on top of the skirt 14. The bridge 16 extends from the middle of the skirt 16 to the top end of the skirt 16 where it is attached to the side of the drill collar 12. The skirt 14 has a top wall 50 and side walls 52 which define a large recess 38, on the opposite side of the skirt 14 to that on which the bridge 16 is attached, which has an opening which faces away from the bridge 16.

The drill collar 12 forms a drill passage 18 which enables a cutting tool, such as a drill bit (not shown), to pass through it (direction of Arrow B in FIG. 5) to engage a work piece 20. The drill collar 12 has a longitudinal axis 22. Both the drill passage 18 and the opening of the recess 38 are orientated in the same direction.

Formed in end 26 of the bridge 16 in the middle of the skirt 14 is an aperture 24 which provides an air exit. The aperture 24 has a longitudinal axis 28 which is perpendicular to and intersects with the longitudinal axis 22 of the drill collar 12.

Formed by an internal wall 30 of the housing 10 is a first passage 32 which extends from the aperture 24 towards the drill passage 18 of the drill collar 12. The internal wall 30 also forms one of the walls which form the recess 38. Formed within the first passage 32 is a throat 34 where the diameter of the passage 32 is reduced. Two apertures 36 are formed through the wall 30 of the passage 32 at the narrowest point of the throat 34. The apertures 36 provide two passageways directly from the passage 32, through the wall 30, to the recess 38 formed by the skirt 14. Such a construction provides the operator with easy access to the apertures 36 should they become blocked with debris as the apertures 36 are exposed to the recess which is easily accessible through the opening of the recess 38.

Each of the two apertures 36 has a longitudinal axis 98, which extends along the length of the passageway formed by the aperture 36, and which intersects with the longitudinal axis 100 of the passage 32, at the point where the apertures 36 and passage 32 meet, at an angle of between 40 and 50 degrees and ideally at 45 degrees (102). The longitudinal axes 98 extends into the passage 32 from the apertures 36, in a direction parallel to the longitudinal axis 100 of the passage 32, in the same direction as the flow of air as it is sucked from the drill passage 18 through the passage 32 (direction of Arrow J in FIG. 5).

The passage 32 splits into two passages 60 between the throat 34 and the drill passage 18, each connecting with the drill passage 18 through a separate aperture 62.

An inlet air passage 64 is formed in by a frame 66 attached to the base of the drill collar 12 and operates in the same manner as that described in EP1457288. Air can pass through the inlet air passage into the drill collar 12 as shown by Arrow D.

A seal 40 locates in a groove 42 formed around the periphery of the wall of the skirt 20 on the underside of the skirt 14. When the suction cup dust extractor is placed against a work piece 20, it engages with the seal 40, the work piece 20 sealing the opening to the recess 38 to form a chamber.

An air hole 68 is provided in the wall 50 of the skirt 20 to provide a small air passage between the recess and the surrounding atmosphere. During the use of the suction cup dust extractor, the hole 68 ensures that there is a limited but constant air flow in the recess formed under the skirt 20 if the seal provides a perfect air seal with the work piece 20.

The suction cup extractor further comprises a tubular connection collar 2 which connects to a vacuum source (not shown). A rubber seal 4 is fastened inside of the connection collar 2 and which comprises two rubber rings 4 which extend radially inwards from the drill collar 12 with an aperture 8 formed through them. The rings 4 are capable of gripping onto the nozzle (not shown) of a hose (not shown) of the vacuum source. As the rings 4 are resilient, they can stretch radially outwardly, increasing the size of the apertures 8, enabling nozzles of different sizes to be used. The rings 4 would then grip the nozzle due to their resilience and frictionally hold the nozzle.

The connection collar 2 connects to the aperture 24 via a flexible tube 72. One end of the flexible tube 72 is held in a sleeve 74 formed in the connection collar 2, the other in a sleeve 76 formed in the bridge 16. The flexible tube 72 can be stretched to extend its length and move the collar 2 away from the housing 10 or be bent or twisted to allow the connection collar 2 to be moved to a range of positions relative to the aperture 24. The flexible tube 72 is made from rubber.

In use, the suction cup dust extractor is placed against a surface 70 of the work piece 20 so that the seal 40 makes contact with it. A chamber is formed when opening of the recess 38, formed by the walls 30, 50, 52, of the skirt 14 is sealed by the surface 70 of the work piece 20. The suction device is activated, and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the two apertures 36 due to a venturi effect. This results in the air in the recess 38 to be sucked out through the apertures 36 and into the passage 32. This causes the skirt 14 and hence the dust extractor, to be attached to the surface 70 due to the suction. The hole 68 ensures that there is a constant flow of air from the hole 68, through the recess 38, and then through the two apertures 36. The operator can then drill a hole in the surface by passing the drill bit through the drill collar 12 and drilling into the surface 70. Any debris generated during the drilling process will be sucked up into the drill passage 18 and then into passages 60. The use of two passages provides better debris clearance. The debris is then transported through the passage 32, through the aperture 24, through the flexible tube 72 and then through the connection collar 2. The hole 68 ensures that there is always air passing through the two apertures into the passage 32, thus ensuring no debris passes into the apertures 36 or the recess 38. Furthermore, the 45-degree angle between the apertures 36 and passage 32 further reduces the risks of any debris entering the apertures 36 as it sucked past the apertures 36 from the drill passage 18 to the aperture 24.

A second example of suction cup dust extractor will now be described with reference to FIGS. 8 to 15. Where the same features are present in the second example are also present in the first example, the same reference numbers have been used. The design of the second example is the same as that for the first embodiment except for the design of three features, namely, 1) the design of the seal 40 has been altered, 2) the provision of an additional aperture to the two apertures 36, and 3) a new feature of a pressure release mechanism for the recess 38 has been added.

Firstly, the changes to the design of the seal will be described.

Figure 10:
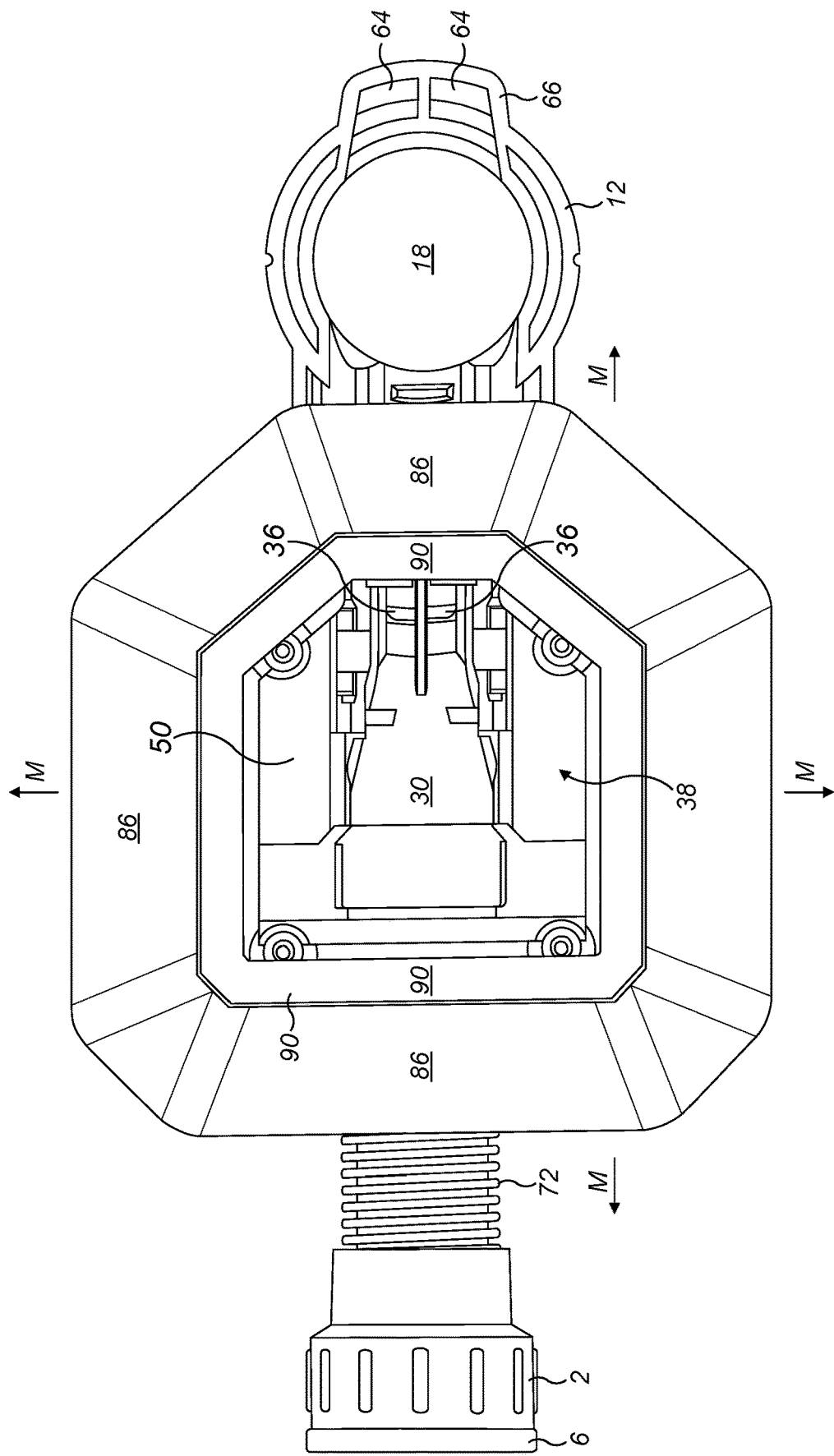
FIG. 10 shows a bottom view of the suction cup dust extractor.
Figure 11:
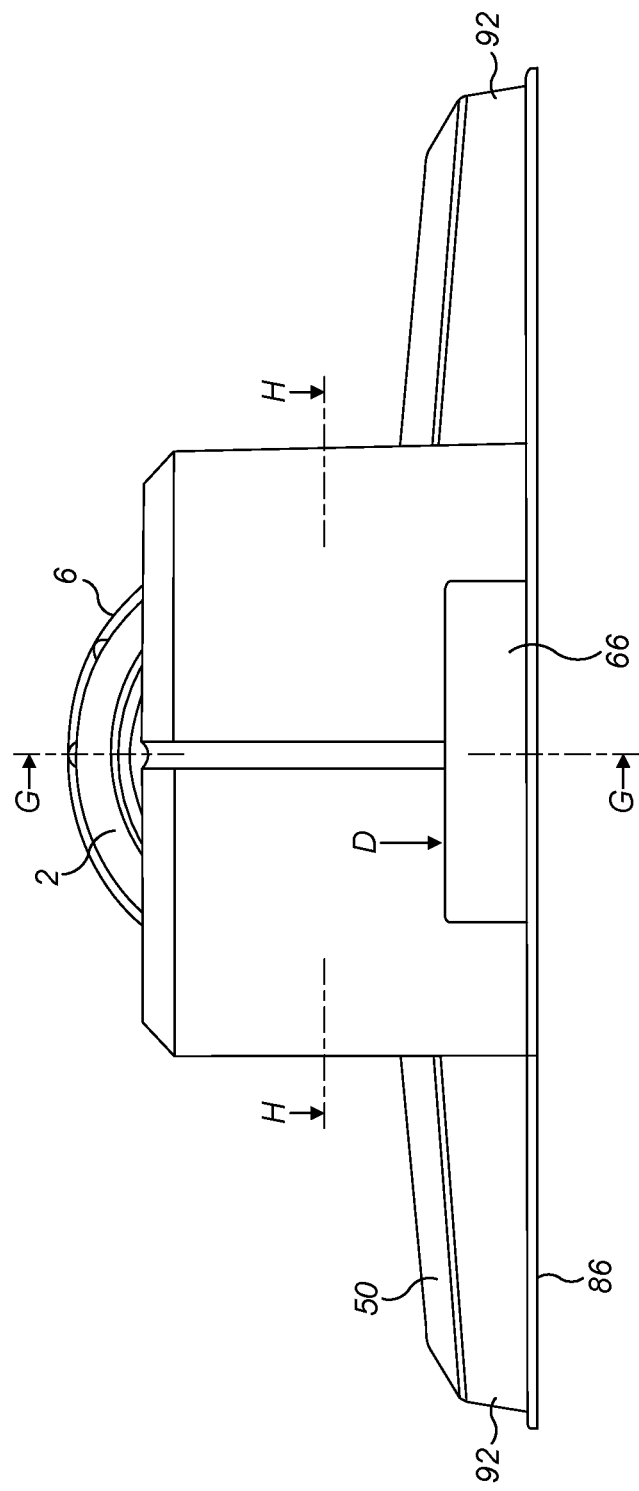
FIG. 11 shows a front view of the suction cup dust extractor.
Figure 12:
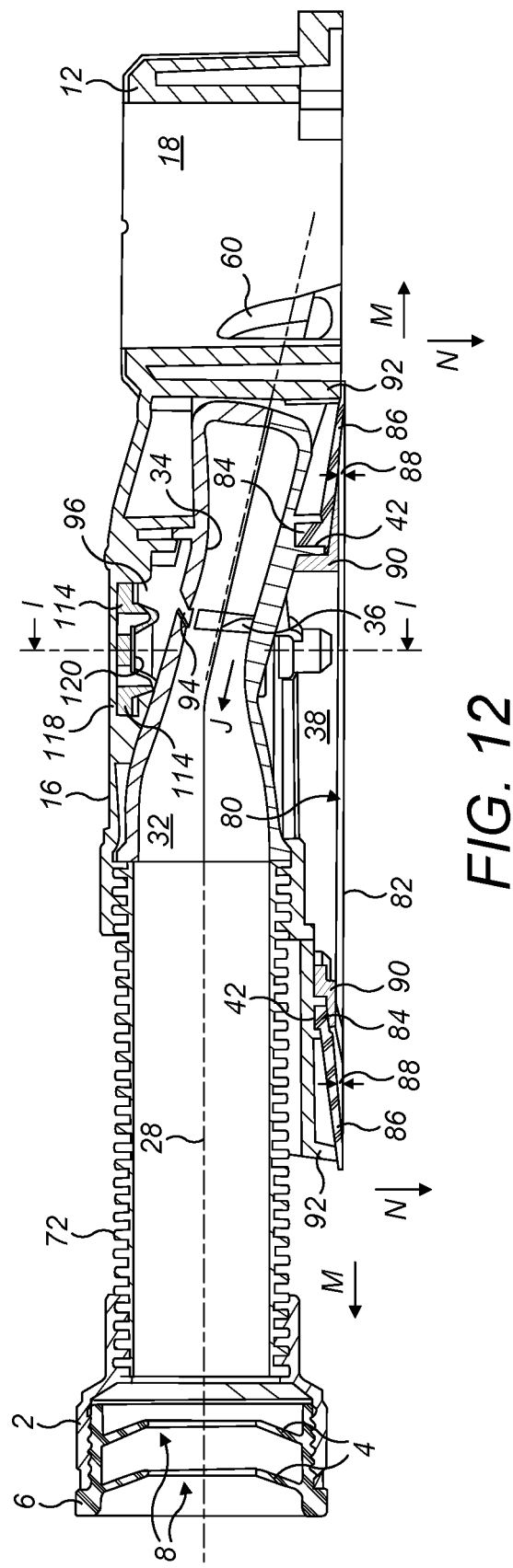
FIG. 12 shows a vertical cross-sectional view of the suction cup dust extractor in the direction of Arrows G in FIG. 11.
Figure 14:
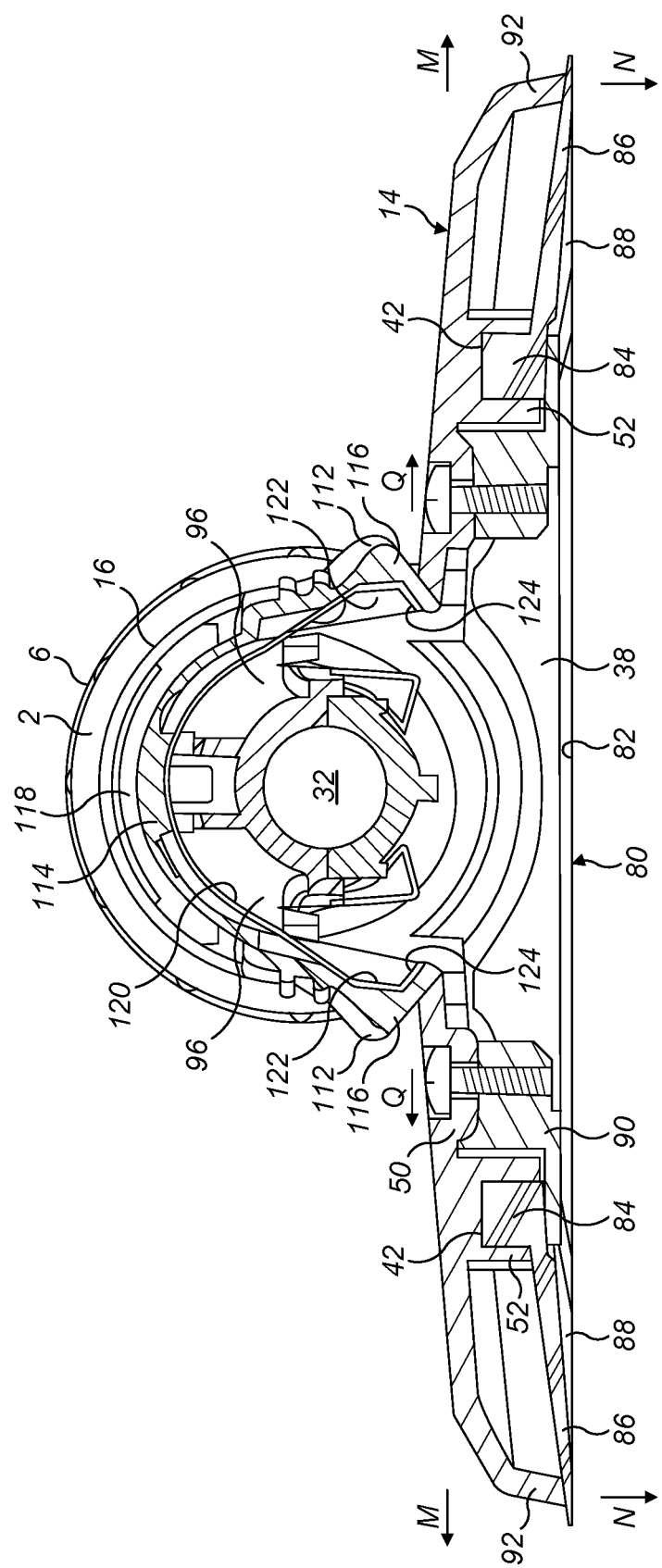
FIG. 14 shows a vertical cross-sectional view of the suction cup dust extractor in the direction of Arrows I in FIG. 12.

Referring to FIGS. 10, 12, and 14, the opening 80 of the recess 38 is planar ie the periphery of the opening 80 locates in a flat plane 82. The seal comprises a base 84 which locates in a groove 42 formed in the wall 52 of the skirt 14. The base 84 of the seal is held within the grove 42 via cover 90 which is held in place on the housing using screws (not shown). A flange 86 is attached to the base 84 which extends from the base 84 in a direction which is an oblique or small angle 88 relative to the plane 82. The flange 86 extends, in a direction parallel to the plane 82 (in the direction of Arrows M), away from the opening 80. The flange 86 extends, in a direction perpendicular to the plane 82 (in the directions of Arrows N), away from the opening 80. The outer perimeter of the flange 86 is supported by a secondary wall 92 formed on the shirt 14 of the housing 10.

Secondly, the additional aperture 94 and its inter connection with the recess will now be described.

Figure 13:
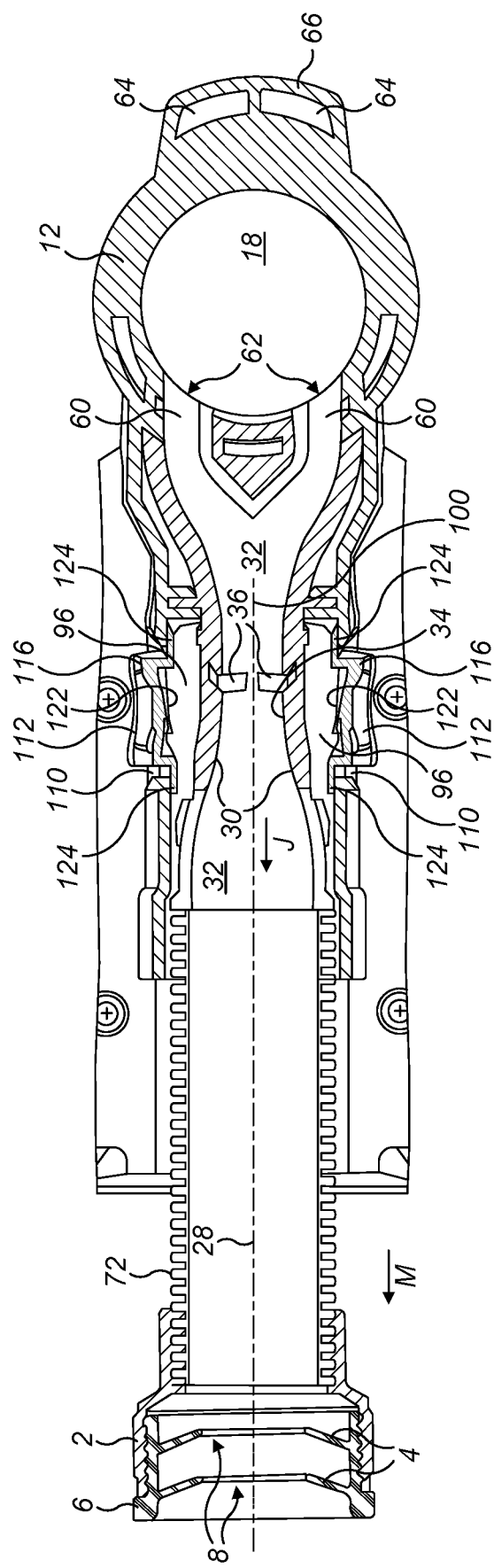
FIG. 13 shows a horizontal cross-sectional view of the suction cup dust extractor in the direction of Arrows H in FIG. 11.
Figure 15:
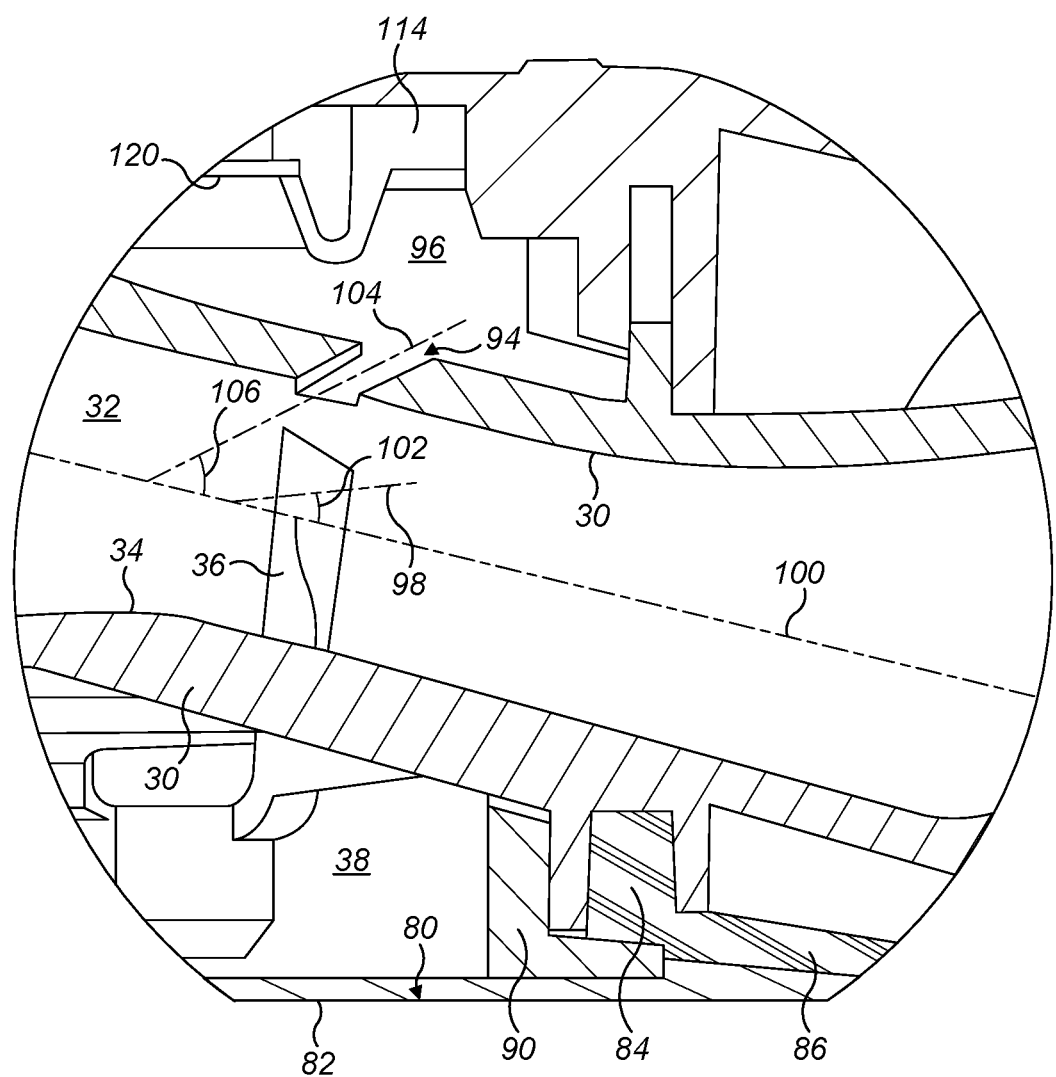
FIG. 15 shows a close-up view of the venture passages.
Figure 16:
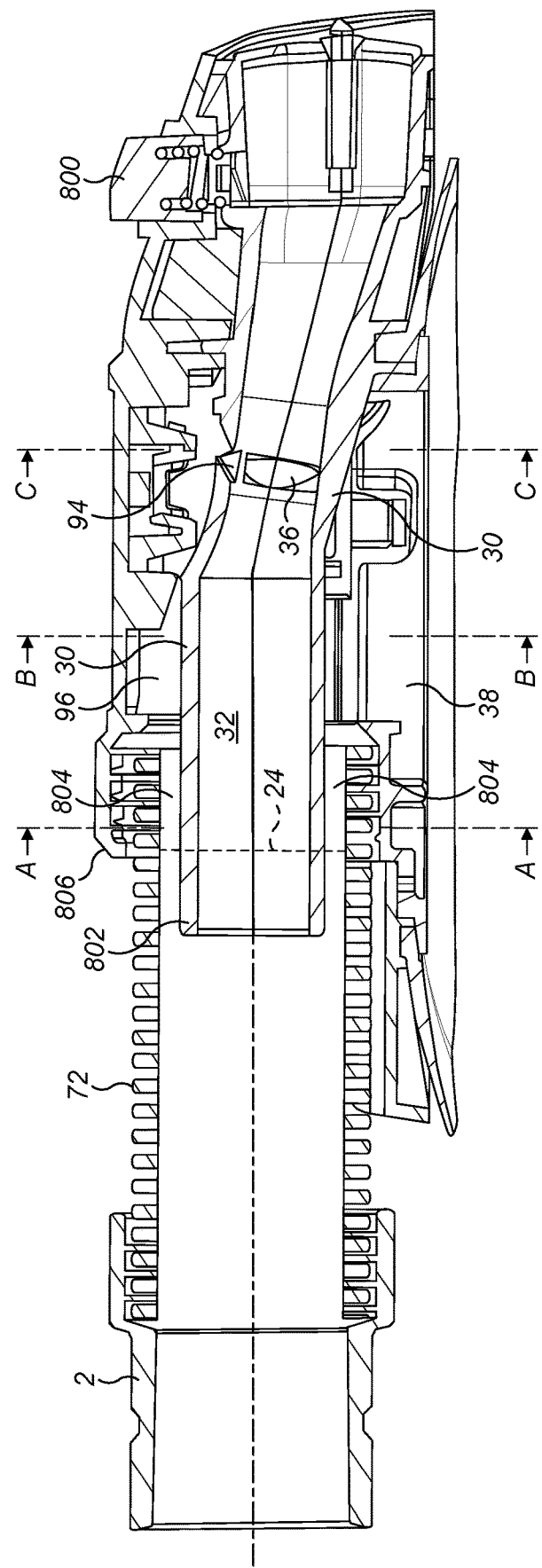
FIG. 16 shows a vertical cross section of a dust extractor in accordance with a third example of a suction cup dust extractor.
Figure 17:
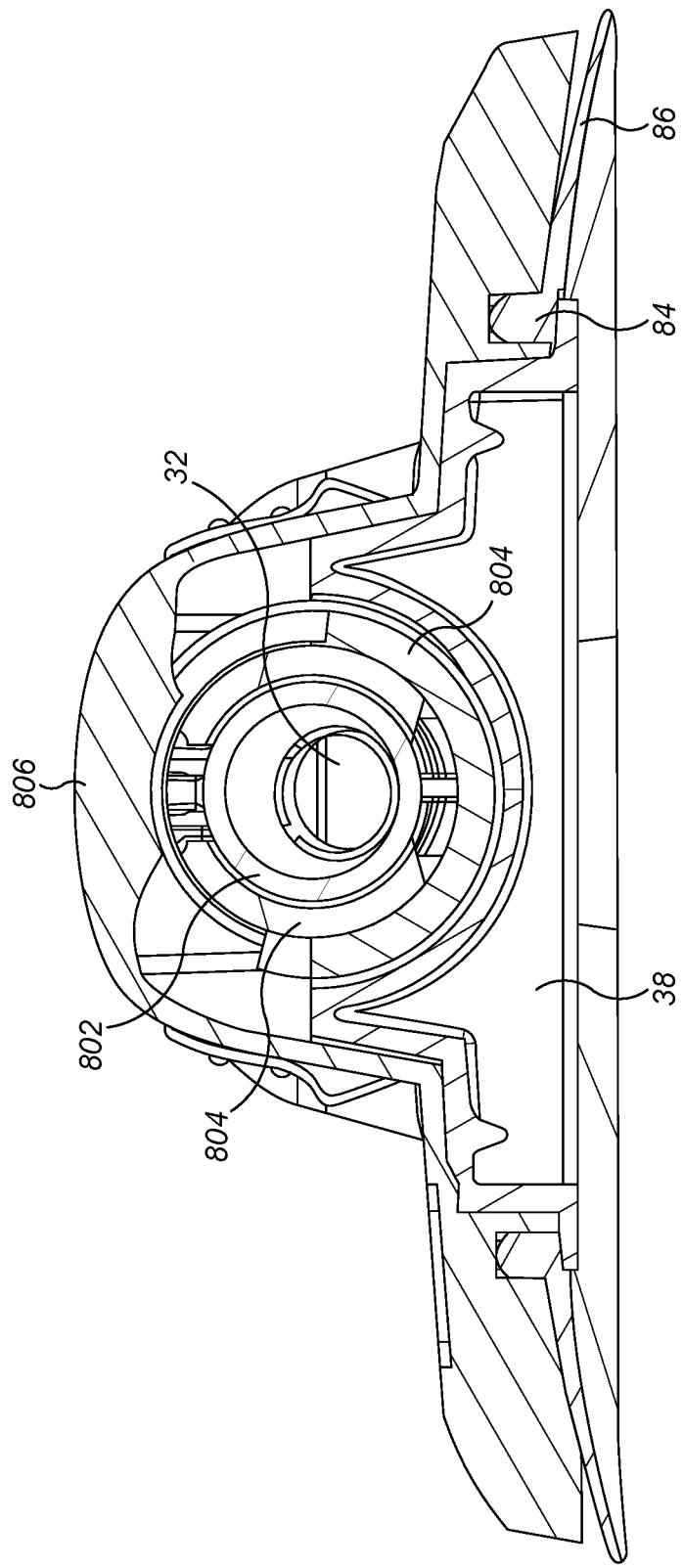
FIG. 17 shows a vertical cross section of the dust extractor in the direction of Arrows A shown in FIG. 16.
Figure 18:
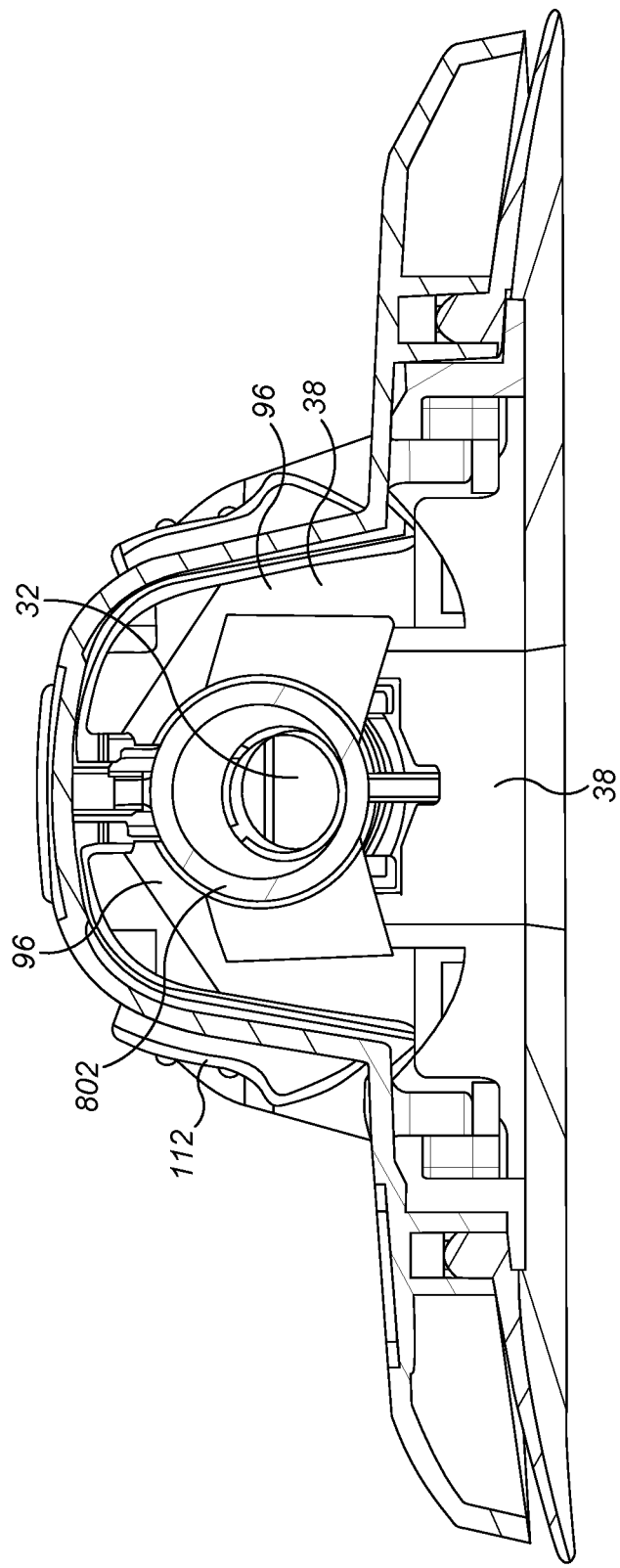
FIG. 18 shows a vertical cross section of the dust extractor in the direction of Arrows B shown in FIG. 16.
Figure 19:
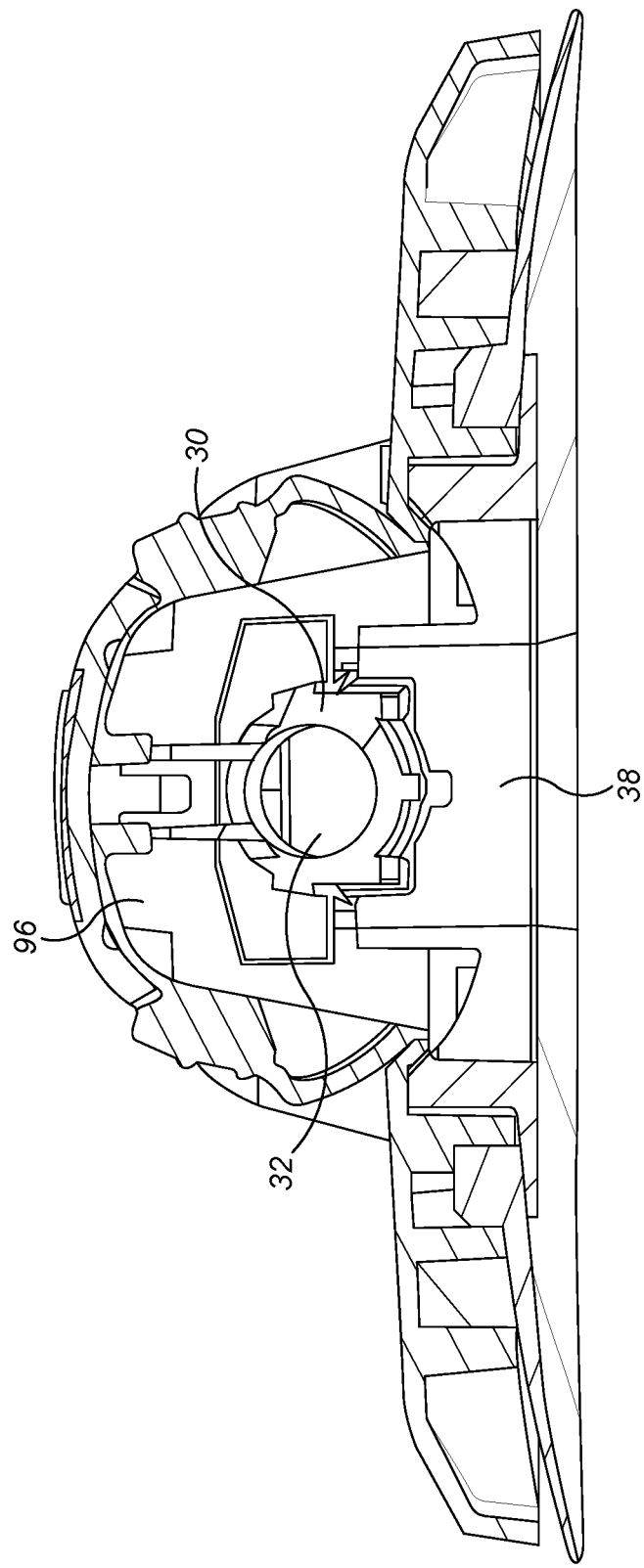
FIG. 19 shows a vertical cross section of the dust extractor in the direction of Arrows C shown in FIG. 16.
Figure 20:
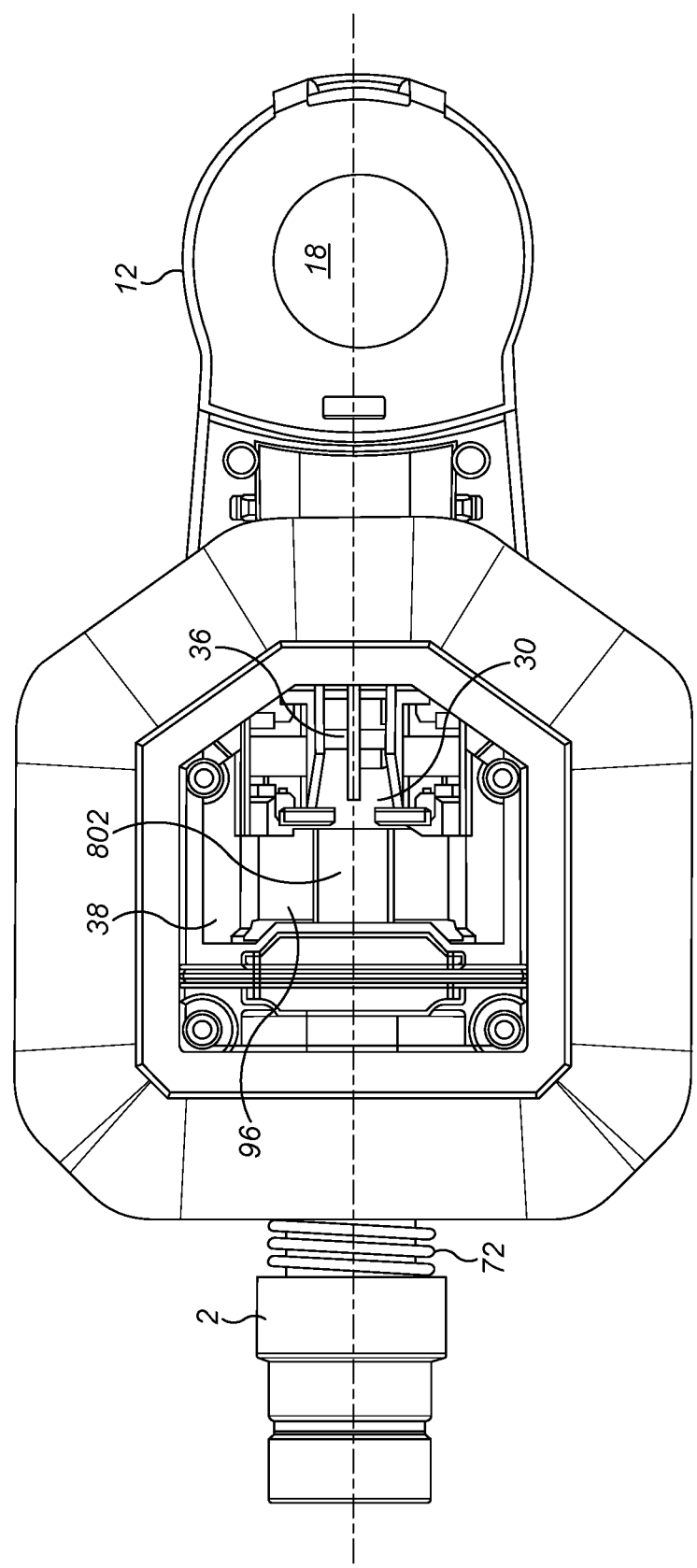
FIG. 20 shows an underside view of the dust extractor of FIG. 16.
Figure 21:
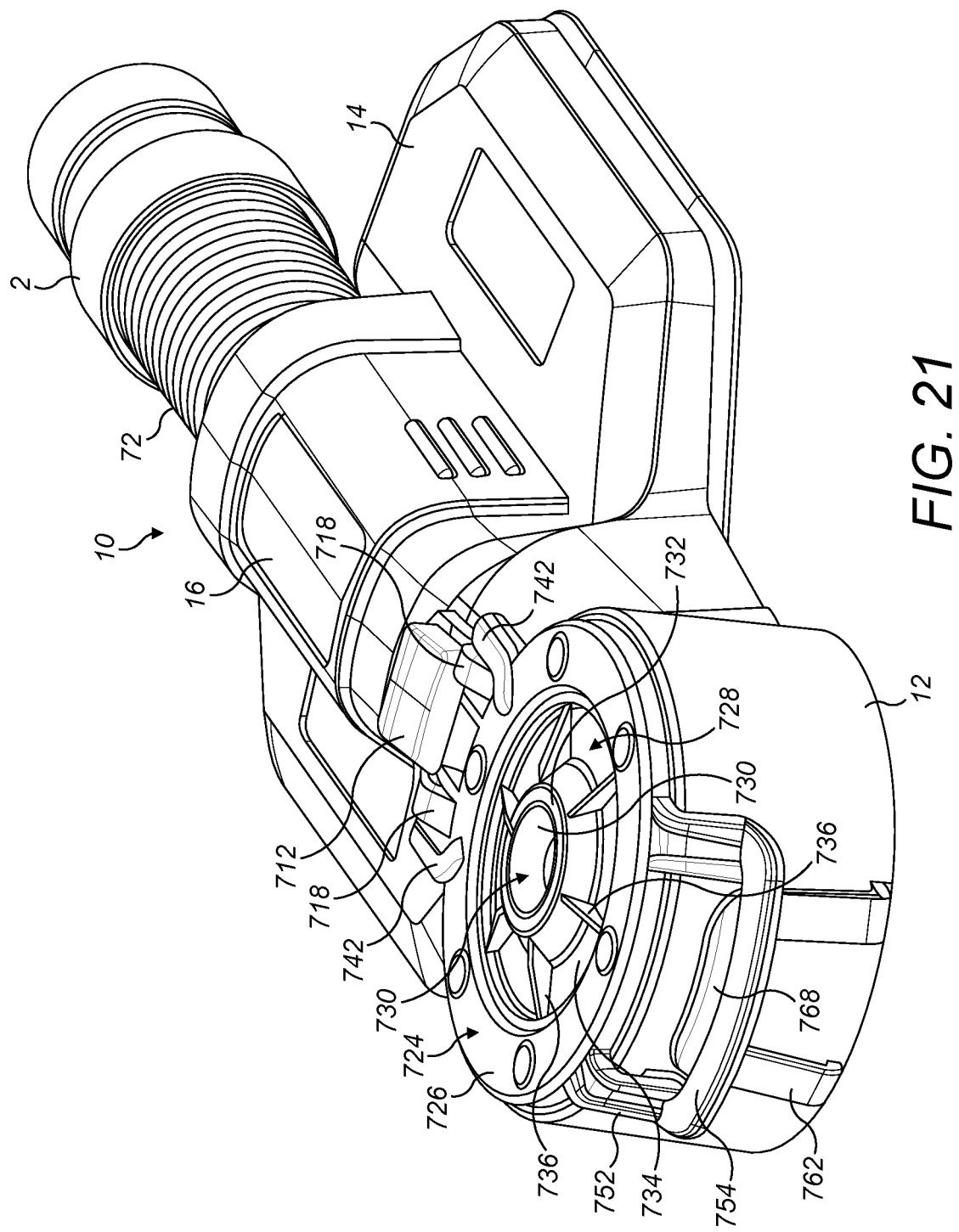
FIG. 21 shows a perspective top view of a dust extractor in accordance with a first embodiment of the present invention.
Figure 22:
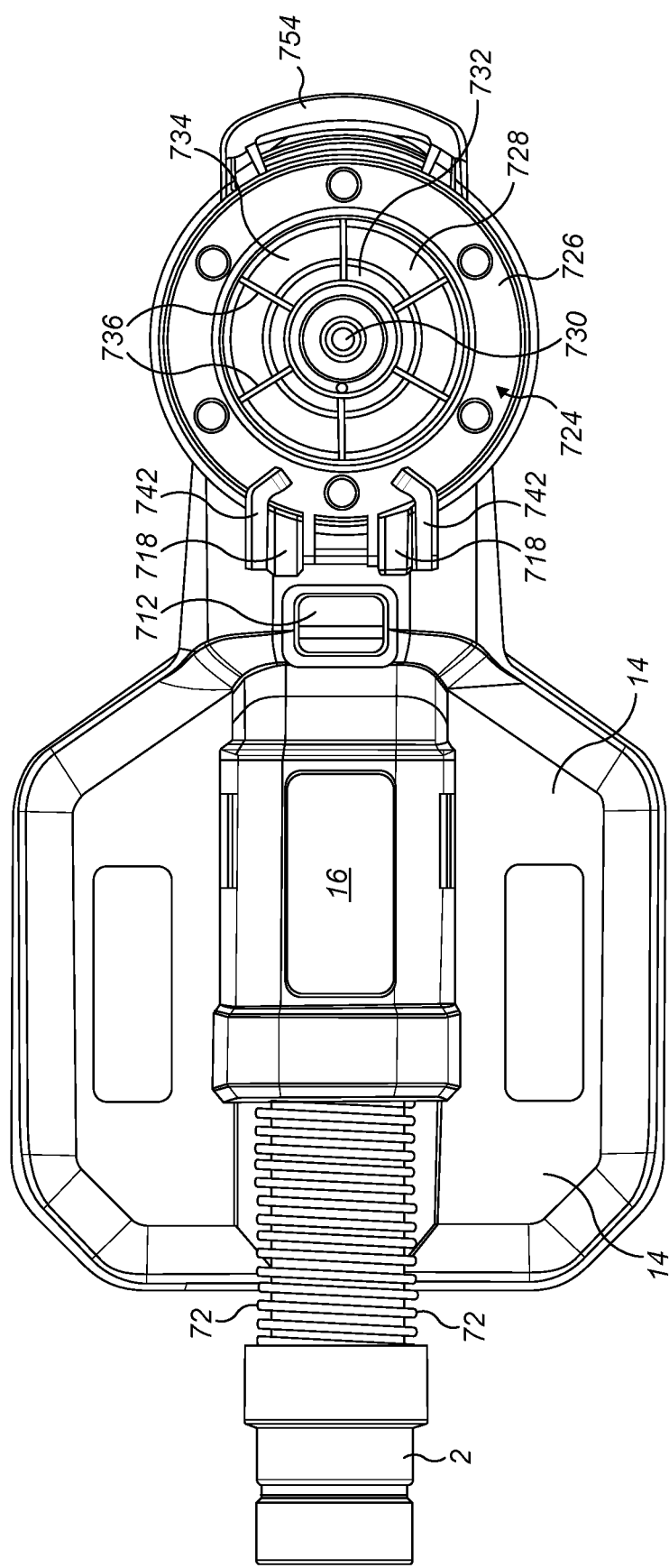
FIG. 22 shows a top view of the dust extractor of FIG. 21.
Figure 23:
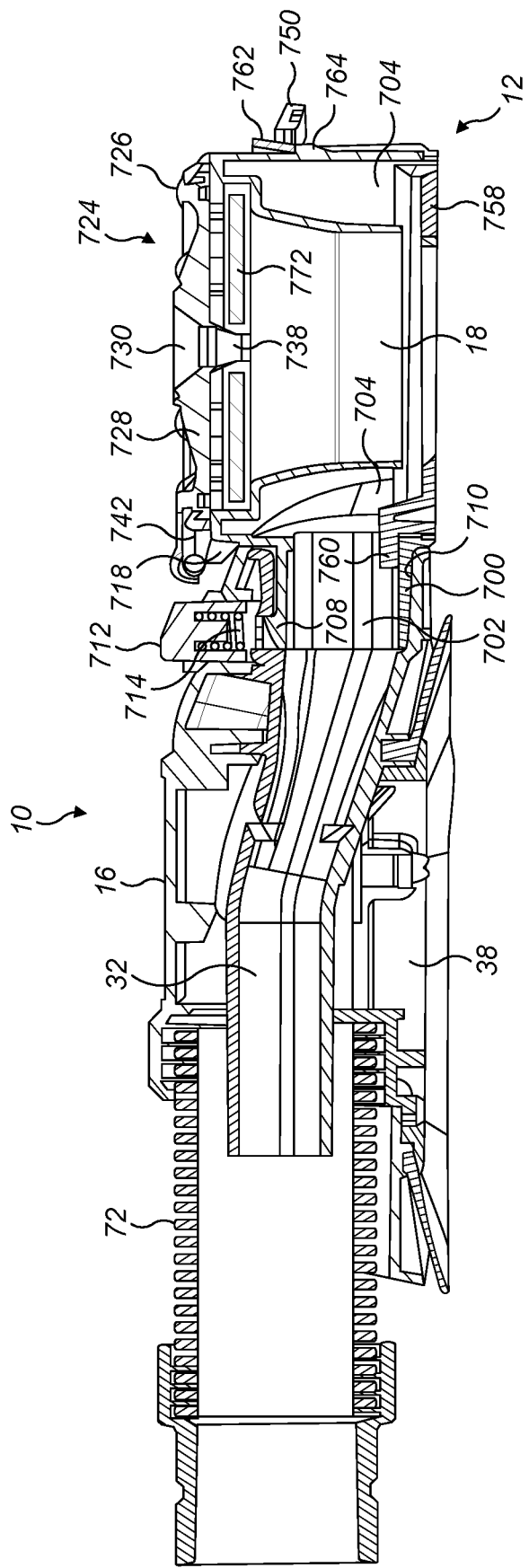
FIG. 23 shows a vertical cross-sectional view of the dust extractor of FIG. 21.
Figure 24:
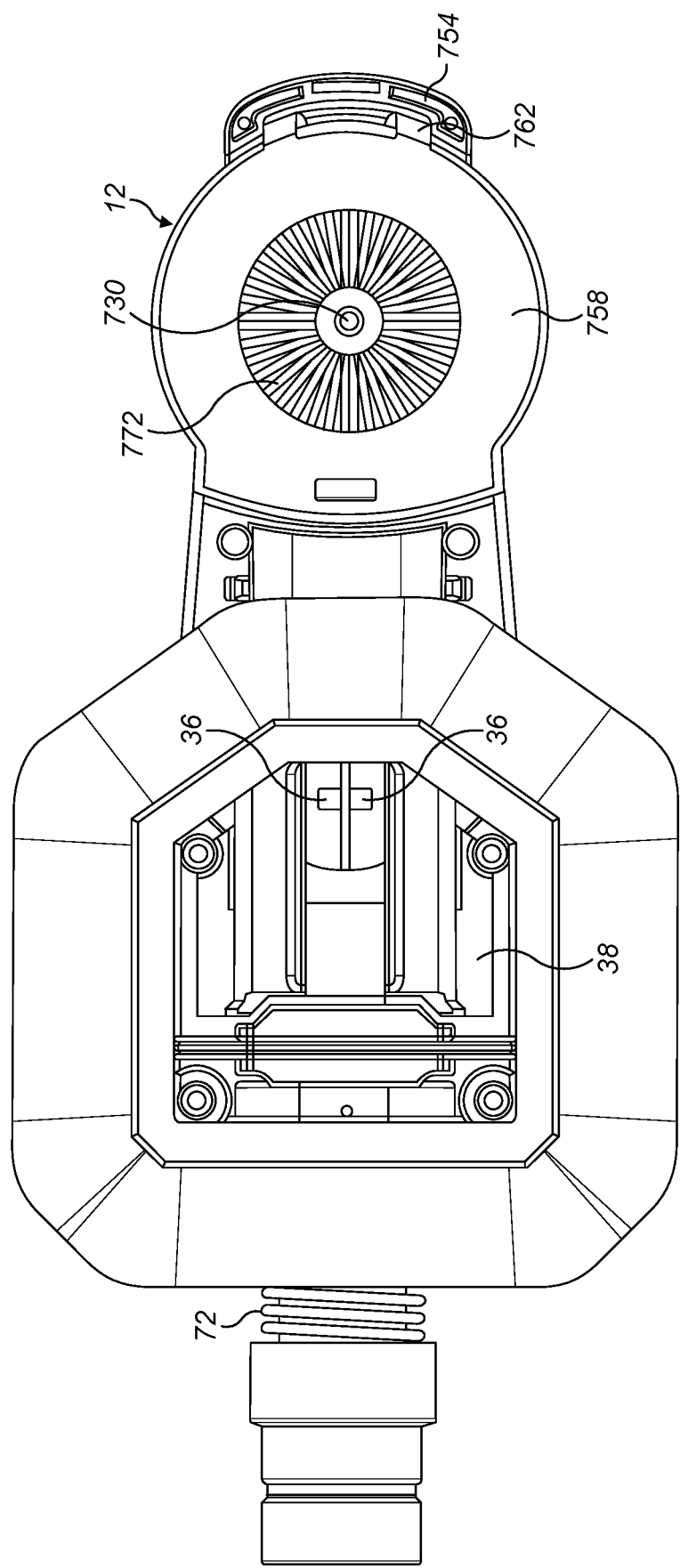
FIG. 24 shows a bottom view of the dust extractor of FIG. 21.

Referring to FIGS. 12, 13 and 15, in addition to the two apertures 36 formed through the wall of the passage 32 at the narrowest point of the throat 34 to provide two direct passageways from the passage 32 to the recess 38, there is provided a third aperture 94, located between the two apertures 36, which is formed through the wall of passage 32 at the narrowest point 34 and which connects to an intermediary chamber 96 formed in the bridge 16. The intermediary chamber 96 connects to the recess 38 so that air can feely move between the intermediary chamber 96 and the recess 38. The outer wall of the intermediary chamber is formed by the external wall of the bridge 16.

Each of the two apertures 36 has a longitudinal axis 98, which extends along the length of the passageway formed by the aperture 36, and which intersects with the longitudinal axis 100 of the passage 32, at the point where the apertures 36 and passage 32 meet, at an angle of between 40 and 50 degrees and ideally at 45 degrees (102). The longitudinal axes 98 extend into the passage 32 from the apertures 36, in a direction parallel to the longitudinal axis 100 of the passage 32, in the same direction as the flow of air as it is sucked from the drill passage through the passage 32 (direction of Arrow J in FIGS. 12 and 15).

The third aperture 94 has a longitudinal axis 104, which extends along the length of the passageway formed by the aperture 94, and which intersects with the longitudinal axis 100 of the passage 32, at the point where the third aperture 94 and passage 32 meet, at an angle of between 40 and 50 degrees and ideally at 45 degrees 106. The longitudinal axis 104 extends into the passage 32 from the aperture 94 in a direction parallel to the longitudinal axis 100 of the passage 32, in the same direction as the flow of air as it is sucked from the drill passage through the passage 32 (direction of Arrow J in FIGS. 12 and 15.

The 45-degree angle between the apertures 36 and passage 32 reduces the risks of any debris entering the apertures 36 or third aperture as it sucked past the apertures 36, 94 from the drill passage 18 to the aperture 24.

The addition of the third aperture provides for increased suction in the recess 38.

Thirdly, the new feature of a pressure release mechanism for the recess 38 will now be described.

Formed in each side of the bridge 16 is a button aperture 110. Located within each button aperture 110 is a button 112. Each button 112 is mounted on an end 116 of a flexible plastic support 114 which extends around the inside of the outer wall 118 of the bridge 16 inside of the intermediary chamber 96, wrapping around the top half of the passage 32 (see FIG. 14). A leaf spring 120, which extends along the length of the plastic support 114, is surrounded by the plastic support 114, and also wraps around the top half of the passage 32. The ends 122 of the leaf spring 120 directly engage behind the ends 116 of the plastic support behind the buttons 112. The leaf spring 120 is resilient in nature and, if left in isolation would straighten up along its length. When located as shown in FIG. 14, the leaf spring 120 has been bent against its biasing force in order to be able to fit in the position as shown. The ends of the leaf spring 120 urge the ends 116 of the plastic support outwardly (in the direction of Arrow Q), urging the buttons 112 through the apertures 110.

The edges of the ends 116 of the plastic support 114 engage with the edges 124 of the walls of the bridge 16 and skirt 14 housing 10, due to the biasing force of the spring 120, to seal the apertures 110, thus preventing any air from escaping from the intermediary chamber 96 through the apertures 110.

In use, the suction cup dust extractor is placed against a surface 70 of the work piece 20 so that the seal 40 makes contact with it. A chamber is formed when opening of the recess 38, formed by the walls 30, 50, 52, of the skirt 14 is sealed by the surface 70 of the work piece 20. The suction device is activated, and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the three apertures 36, 94 due to a venturi effect. This results in the air in the recess 38 to be sucked out either directly through the two apertures 36 or through the intermediary chamber 96 and the third aperture 94 and into the passage 32. This causes the skirt 14 and hence the dust extractor, to be attached to the surface 70 due to the suction. During the normal operation, the buttons 112 are in their outer most position due to the biasing force of the leaf spring 120, the edges of the ends of the plastic support engaging with the edges 124 of the of the walls of the bridge and skirt 14. In order to release the suction cup extractor from the wall, the operator has two options. Firstly, the operation can switch of the vacuum device, reducing the pressure in the recess. Alternatively, the operator can depress the buttons 112, moving the buttons 112 and the ends 116 of the plastic support 114, against the biasing force of the leaf spring 120, into the intermediary chamber 96, breaking the seal formed between the edges of the ends 116 of the plastic support 114 and the edges 124 of the of the walls of the bridge 16 and skirt 14, allowing air to be sucked in to the intermediary chamber from the air surrounding the extractor. This increases the pressure in the intermediary chamber 96 which, in turn, increases the pressure in the recess 38. As such, the amount of suction created within the recess is reduced, allowing the operator to remove the extractor from the wall.

The use of two button constructed in this manner allows the operator to pinch the buttons 112 to release the extractor and support the extractor whilst only holding the buttons 112.

A third example of a suction cup dust extractor now be described with reference to FIGS. 16 to 20. Where the same features are present in the embodiment are also present in the second known example described above, the same reference numbers have been used. The design of the embodiment is the same as that for the second example except for the design of the aperture 24, the first passageway 38 and the drill collar 12.

In the second example, the peripheral wall of the housing 10 which surrounds the aperture 24 connects to the wall 30 of the housing 10 which forms the first passage 32. The first passage 32 extends from the aperture 24 to the drill passage 18 of the collar 12 so that air can flow from the drill passage 18 of the collar 12 to the aperture 24 through the first passage 32. Part of the wall 30 of the first passage 32 forms part of the wall 30 of the recess 38. The first passage 32 connects to the recess through two apertures 36. As such, air can only pass directly between the recess 38 and the first passage 32 through the two apertures 36. Formed in the bridge 16 is an intermediary chamber 96. Part of the wall 30 of the first passage 32 forms part of the wall 30 of the intermediary chamber 96. The first passage 32 connects to the recess 38 through a third aperture 94. As such, air can only pass directly between the intermediary chamber 96 and the first passage 32 through the third apertures 94. The intermediary chamber 96 and recess are connected so that air can flow between the intermediary chamber 96 and the recess 38. Therefore, air can only flow from the recess 38 and the first passage 32 either directly through the two apertures 36 or indirectly through the third aperture 94. As such, air can only flow from the recess 38 to the aperture 24 either directly through the two apertures 36 or indirectly through the third aperture 94, and then through the first passage. As such the amount of the air that can flow from the recess 38 to the aperture is limited by the size of the three apertures 36, 94.

In the third example, the aperture 24 is directly connected to the recess 38 and intermediary chamber 96. The part of the wall 30 which forms the first passage 32 which is located in close proximity to the aperture 24 is formed as a straight tube 802. The tube 802 extends through the aperture 24. The tube 802 extends perpendicularly to the plane of aperture 24 and to the drill passage 18. The diameter of the aperture 24 is greater than that of the tube 802 such that a gap 804 is formed around the tube 802 within the aperture 24. The gap 804 extends along the tube 802, between the tube 804 and the wall 806 which forms the perimeter of the aperture 24, until it engages with the recess 38 and the intermediary chamber 96. The gap 804 is in direct fluid communication with the recess 38 and intermediary chamber 96, to form a second air passage, so that air can flow directly from the recess 38 and intermediary chamber 96 through the gap 804 in order to pass through the aperture 24. The tube 804 extends into the end of the flexible tube 72, which connects between the connection collar 2 and aperture 24, with the end terminating inside of the flexible tube 72. The end of the tube 802 remote from the drill passage, inside of the flexible tube 72 is free standing i.e. it does connect to or make contact with any other part of the housing.

The intermediary chamber 96 is located above the first passage 32. The recess 38 is located below the first passage 32. The intermediary chamber 96 extends downwardly around both sides of the first passage 32, including a part of the tube 802, to merge with the recess 38 which extends upwardly around both sides of the first passage 32, including the part of the tube 802, to form a suction chamber 38, 96. As such, the suction chamber 38, 96 surrounds the part of the tube 802

During the operation of the suction cup dust extractor, the suction cup dust extractor is placed against a surface 70 of the work piece 20 so that the seal 40 makes contact with it. The suction chamber 38, 96 is sealed when opening of the recess 38 is sealed by the surface 70 of the work piece 20. The suction device is activated, and air is sucked through the connection collar 2, through the flexible tube 72, through the aperture 24, through the first passage 32, through the pair of separate passages 60, through the apertures 62 and then from the drill passage 18. In addition, air is also through the connection collar 2, through the flexible tube 72, through the aperture 24, from the suction chamber 38, 96. This results in the air in the suction chamber 38, 96 to be sucked out to hold the suction cup dust extractor to the work surface. This is in addition to air being sucked out of the recess 38 through the two apertures 36 into the first passage 32 and out of the intermediary chamber 96 through the third aperture 94 into the first passage 32. As the gap 804 is larger than the three apertures 36, 94, the reduction in air pressure in the suction chamber 38, 96 is increased.

It will be appreciated by the reader that the three apertures 36, 94 can be omitted from the design, with all of the air being sucked out of the suction chamber 38, 96 through the gap 804 only.

The drill collar is releasably detachable to the housing 10 via a latch mechanism. The drill collar 12 can be detached from the housing by the depression of a button 800. EP2474385 describes such a suction cup dust extractor with a detachable collar.

A first embodiment of the present invention will now be described with reference to FIGS. 21 to 29. Where the same features are present in the first embodiment are also present in the examples described above, the same reference numbers have been used. The design of the embodiment is similar to for the examples described above. The new feature of the first embodiment is the design of the drill collar 12.

Figure 25:
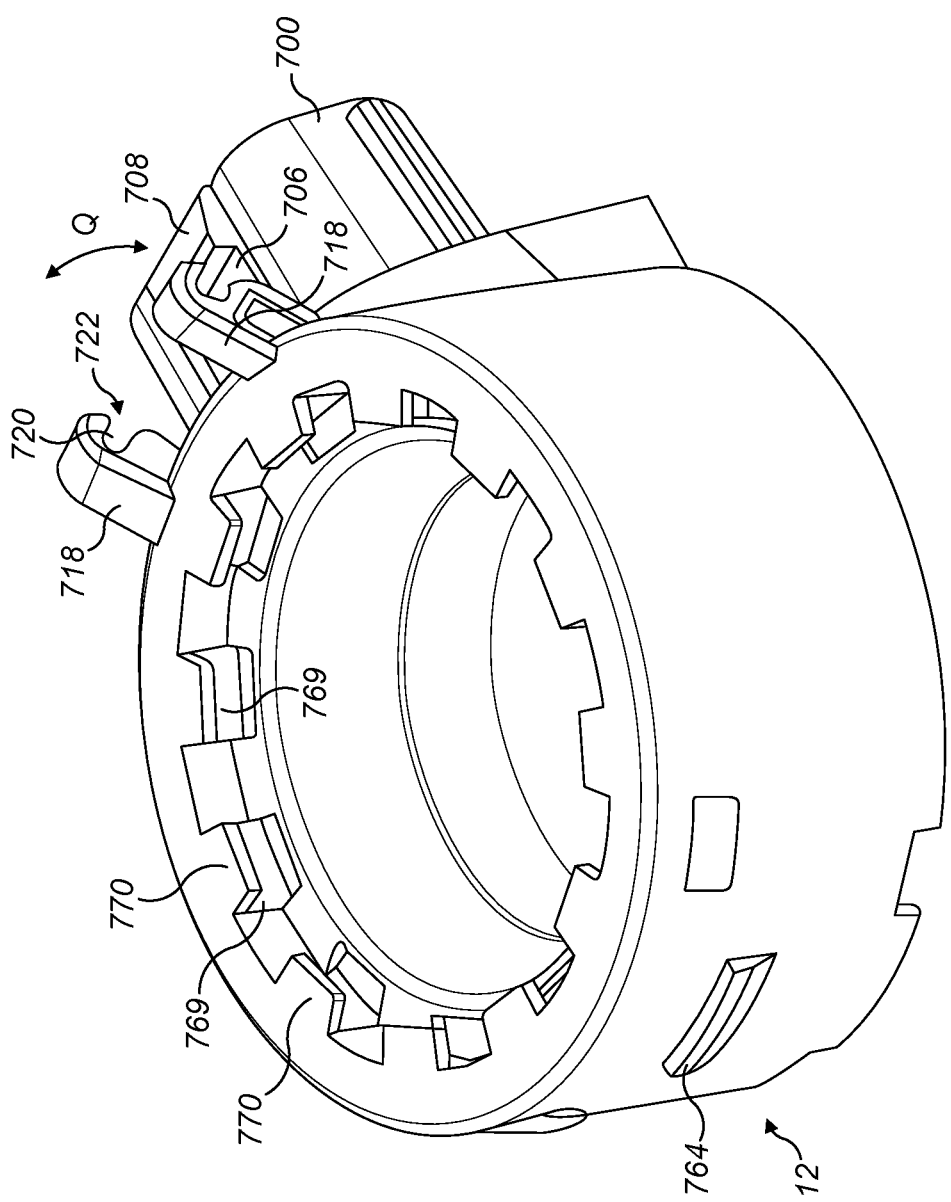
FIG. 25 shows the collar of the dust extractor of FIG. 21.

The drill collar 12 is releasably attached to the housing 10 of the dust extractor. The collar 12 is best seen in FIG. 25 and comprises a tubular extension 700 through which extends an internal passage 702. The internal passage 702 connects with the drill passage 18 of the collar 12 via an intermediate chamber 704 which surrounds the drill passage 18. The tubular extension 700 comprises a flexible tab 706 and a catch 708. The tab 706 can bend in the direction of arrow Q shown in FIG. 25. The tubular extension 700 slides into a correspondingly shaped aperture 710 formed in the housing 10. When the tubular extension 700 is inserted into the aperture 710 of the housing 10, the tab 706 bends inwardly as the catch 708 engages with the wall of the aperture 710 to allow the tubular extension 700 to slide into the aperture 710 until the extension 700 is fully inserted into the aperture 710 where the catch 708 aligns with a recess formed in the wall of the aperture 710, the catch 708 entering the recess allowing the tab 706 to bend outwardly to revert to its original shape. The catch 708 is held in the recess by the resilience of the tab 706. Whilst the catch 708 is held in the recess, the tubular extension 700 is locked into the aperture 710, thus locking the collar 12 to the housing. Whilst the tubular extension 700 is locked into the aperture 710, the internal passage 702 connects to the internal suction passage 32 of the housing 10.

Mounted on the housing 10 is a button 712 which is biased by a spring 714 to an outward position. When the button 712 is in its outward position, the base of the button 712 faces into the recess. When the button 712 is pressed, moving it towards an inner position against the biasing force of the spring 714, the base of the button 712 enters the recess. When the tubular extension 700 is locked into the aperture 710, the catch 708 is located in the recess 716. In order to release the catch 708 from the recess 716, the operator depresses the button 712 in order to move it towards the inner position against the biasing force of the spring 714. The base of the button 712 enters the recess and engages the catch 708 in order to push the catch 708 out of the recess. The operator can then slide the tubular extension 700 out of the aperture 710 to remove the collar 12 from the housing 10.

Mounted on the top of the collar 12 at the rear of the collar 12, above the tubular extension 700 are two extensions 718 with semi-circular holes 720, each having a side opening 722. The extensions 718 form one half of a hinge.

Figure 26:
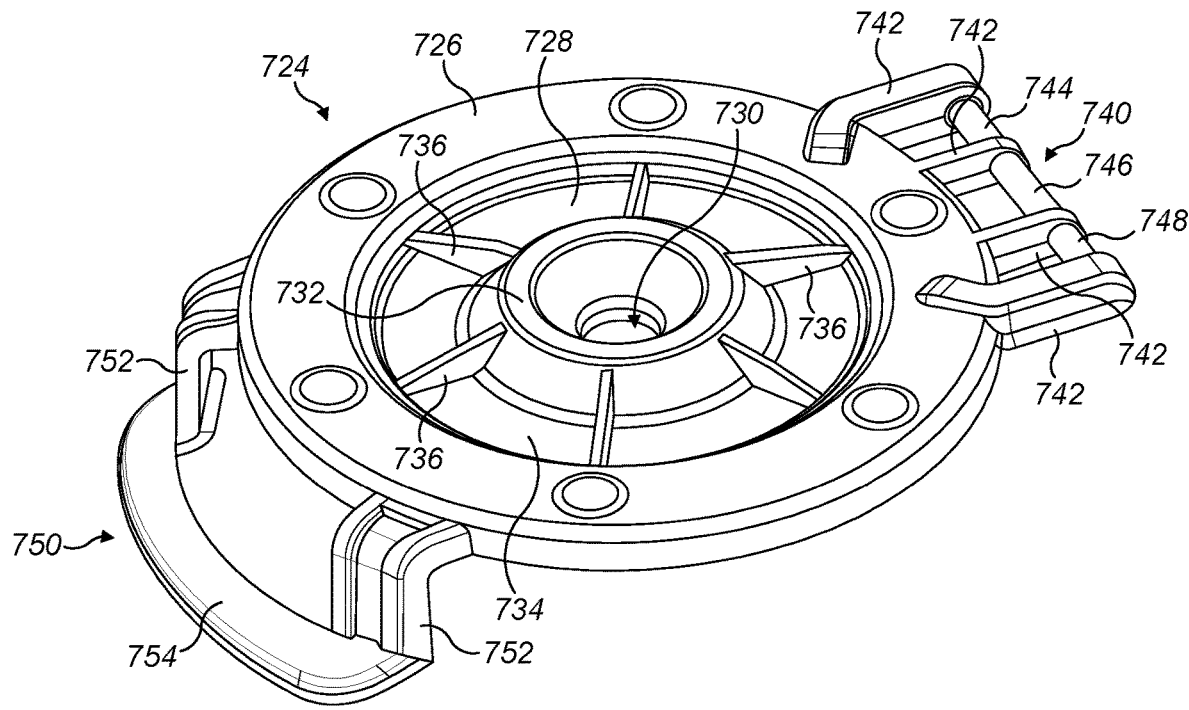
FIG. 26 shows a perspective view of the pivotal cover of the dust extractor of FIG. 21.
Figure 27:
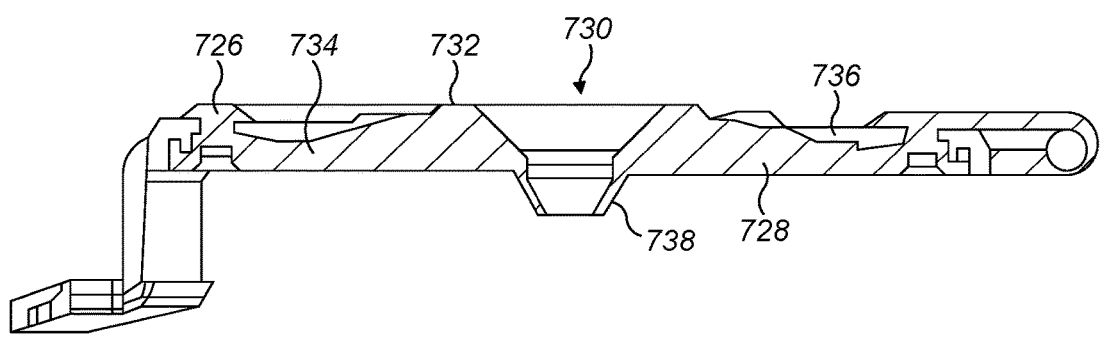
FIG. 27 shows a vertical cross-sectional view of the pivotal cover of the dust extractor of FIG. 21.

Mounted on the top of the collar 12 is a pivotal cover 724 (as best shown in FIG. 26). The pivotal cover 724 comprises a rigid plastic outer ring 726 which surrounds an inner rubber washer 728 with a hole 730 formed through its centre. The outer periphery of the washer 728 is attached to the inner edge of the ring 726.

The washer comprises an inner section 732 with a thickness which is approximately the same as that of the ring 726. Surrounding the inner section 732 is an outer section 734 which connects between the inner section 732 and the ring 726. The thickness if the outer section 734 in less than the inner section 732. The inner section forms a conical shaped hole 730. A plurality of radial ribs 736 are formed on the top surface of the outer section 734 and extend from the inner section 732 radially outwardly to the ring 726. The ribs provide support for the inner section 732 when a pipe is passed through the hole 730. Formed on the underside of the inner section 732 is a conical funnel 738 which extends the length of the hole 730 formed through the inner section 732. The washer 728 is formed in a one-piece construction.

The washer 728 is integrally molded onto the ring 726.

Mounted on the rear of the pivotal cover 724 is a rod 740 which is supported by four posts 742 which divide the rod 740 into three sections 744, 746,748. The posts 742 and the rod 740 are integrally formed with the outer ring 726. The posts 742 connect to the outer ring 726. The rod 740 forms the other half of the hinge. The two outer sections 744, 748 are able to be releasably clipped into the semi-circular holes 720 of the two extensions 718 to form the hinge. When the rod 40 is clipped in the semi-circular holes 720, the rod 740 can freely pivot about an axis within the semi-circular holes 720 allowing the cover to pivot towards or away from the collar 12. The axis extends in a direction parallel to a plane of the entrance of the drill passage 18. The pivotal cover 726 can pivot from a first position where it covers the top entrance to the drill passage 18 to a second position where it extends away from the collar exposing the top entrance to the drill passage 18 of the collar 12. The pivotal cover 724 can be removed from the collar 12 by unclipping the rod 740 from the semi-circular holes 720. This allows the collar to be used without the cover 724.

Mounted on the front of the pivotal cover 724 is a U-shaped catch 750. The U-shaped catch 750 comprises two arms 752 which are attached to the outer ring 726 and which extend, in parallel to each other, perpendicularly to the plane of the pivotal cover 724 and an interconnecting bar 754 which connects between the two ends of the arms 752 remote from the outer ring 726. The arms 752 and the bar 754 are integrally formed with the outer ring 726. The U-shaped catch 750 is used to lock the cover 726, when clipped onto the collar 12, in its first position where it covers the top entrance to the drill passage 18.

In addition, there is provided a lower cover 758 which clips onto the underside of the collar 12. The lower cover 758 comprises a lip 760 on one side which is capable of being inserted into a recess within the collar 12. On the other side there is a lower cover catch 762. To attach the lower cover 758, the lip 760 is inserted into the recess and then the lower cover catch 762, which is resiliently deformable, engages with a ridge 764 formed on the outer wall of the collar 12. The lower cover 758 comprises an aperture which aligns with the lower exit end of the drill passage. Such a lower cover 758 is described in EP2474384.

When the pivotal cover 72 is clipped onto the collar 12 and is in its first position where it covers the top entrance to the drill passage 18, the U-shaped catch 750, which is resilient deformable, locks the cover 726 by engaging the lower cover catch 762 which comprises an engagement ridge 768. It will be appreciated that as an alternative the U-shaped catch 750 could be made to engage with the ridge 764 on the outside wall of the collar, thus allowing the collar 12 to be used without a lower cover.

A groove 769 is formed around the inner wall of the drill passage 18 adjacent the top entrance of the drill passage 18, the wall of the groove 768 being form by castellations 770. A circular brush 772 comprising an outer ring and bristles which point radially inwardly locates within the groove 769, the outer ring being held in the groove 769 with the bristles extending inwardly covering the top entrance to the drill passage 18.

Figure 28:
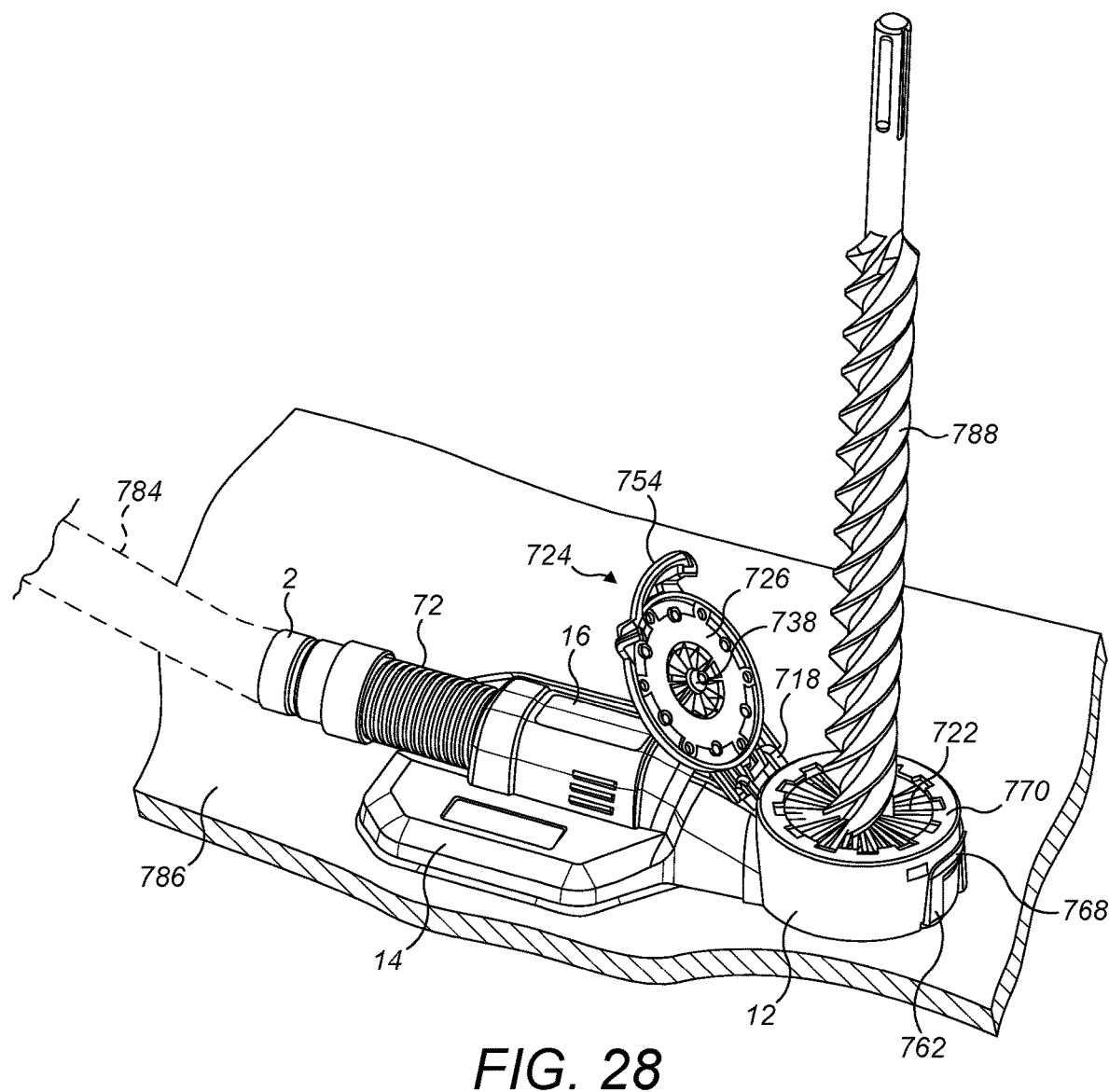
FIG. 28 shows the dust extractor with pivotal cover with the pivotal cover in an open position.

The use of the collar with the pivotal cover will now be described with reference to FIGS. 28 and 29.

The collar 12 is attached to the housing of a suction cup dust extractor. The suction cup dust extractor is attached to a vacuum cleaner 782 via a hose 784 which attaches to the connection collar 2, which is then switched on. The suction cup dust extractor is them placed against a surface 786 of a workpiece to be cut. The suction cup dust extractor becomes attached to the surface due to the suction force crated by the vacuum cleaner in the suction chamber 38. The pivotal cover 724 is moved to its second position, extending away from collar 12 (see FIG. 28). The drill bit 788 of a hammer drill is passed through the drill passage 18 of the collar 12 to engage with the surface 786 of the work piece to be cut, passing through the circular brush 772 as it does so. The hammer drill is activated in order to rotate and/or strike the drill bit 788 to drill a hole in the work surface 786. Any dust generated during the drilling process is removed by the suction cup dust extractor and vacuum cleaner 782. The drill bit 788 is them removed from the hole in the surface 786 and the drill passage 18 of the collar 12.

Figure 29:
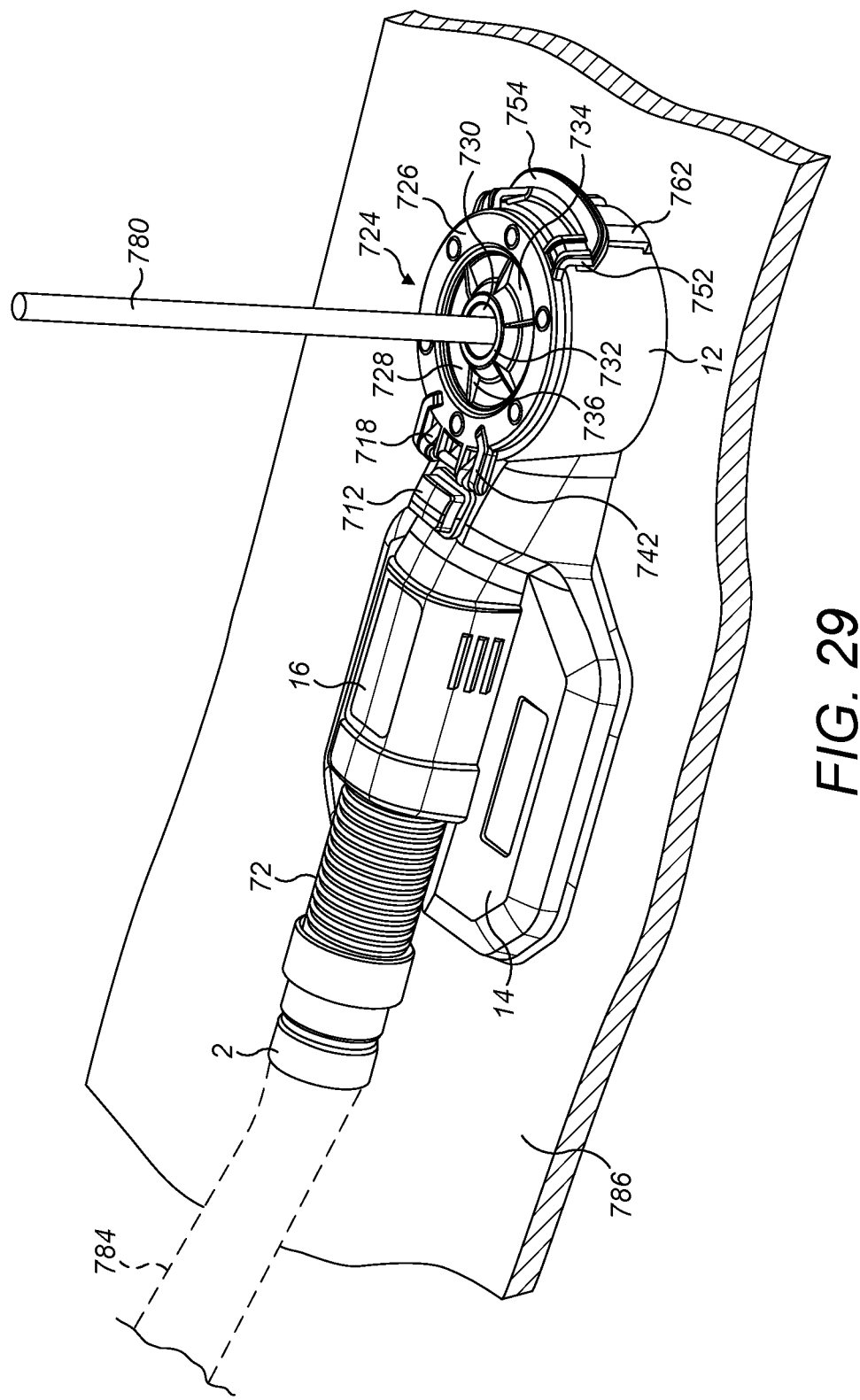
FIG. 29 shows the dust extractor with the pivotal cover with the pivotal cover in a closed position.

The pivotal cover 724 is then moved to and locked in its first position so that the pivotal cover 724 covers the upper entrance of the drill passage 18 as shown in FIG. 29. A pipe 780 from a high pressure air hose 790 of a high air pressure source 782, 792, 794 is then inserted through the hole 730 of the pivotal cover 724, through the drill passage 18 and into the hole in the work surface 786. The conical shape of the hole 730 assists in guiding the pipe 780 through the hole 730 as well as providing a seal between the washer 728 and the outer wall of the pipe 780. A jet of high pressure air is then blasted through the pipe 780 and into the hole in the surface 786. Any dust within the hole is forcefully blown out of the hole and into the drill passage 18. The pivotal cover prevents this dust from exiting the drill passage 18 through upper entrance of the drill passage 18 and ensures that it is sucked into the suction cup dust extractor by the vacuum cleaner 782 and then into the vacuum cleaner 782.

Figure 32A:
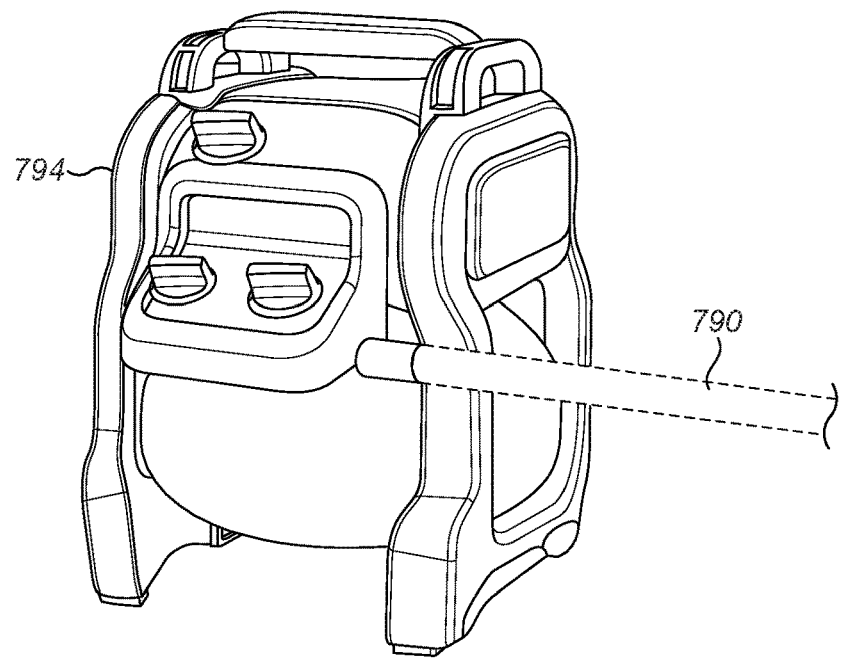
FIG. 32*a* shows an air compressor.
Figure 32B:
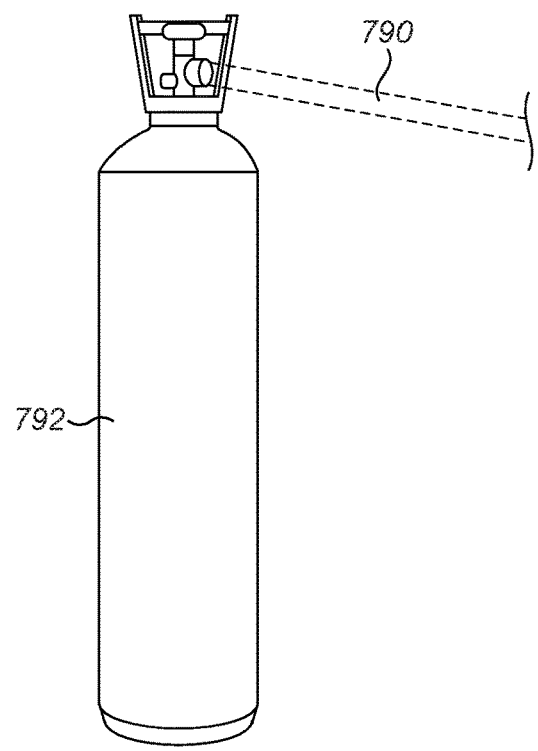
FIG. 32*b* shows a gas cylinder.
Figure 32C:
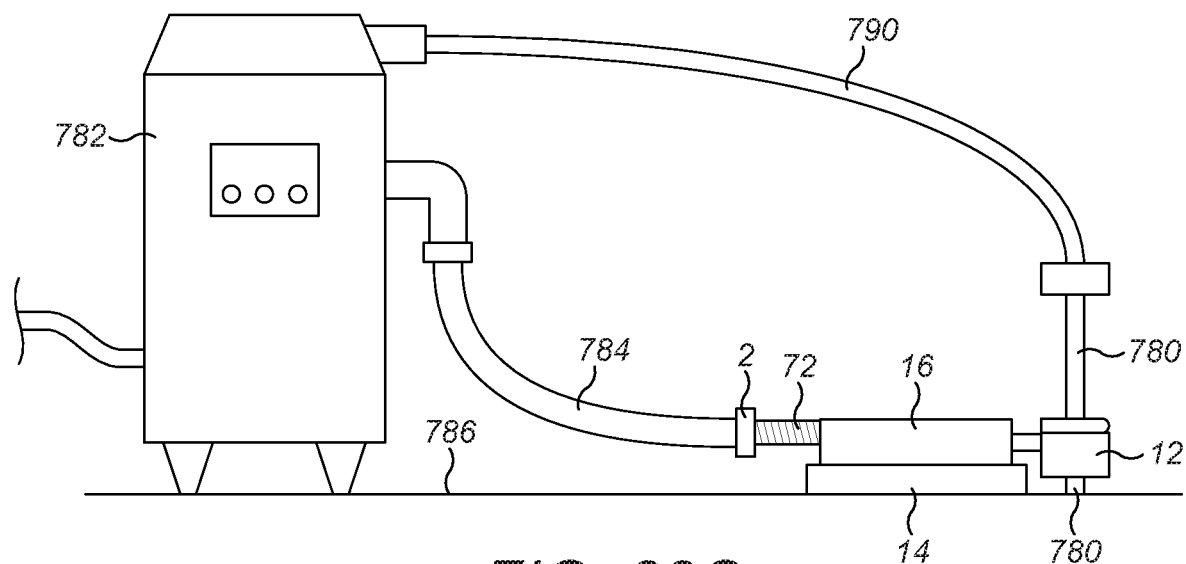
FIG. 32*c* shows a dust extractor and vacuum cleaner where the vacuum is sucking air from the dust extractor and redirecting the air expelled by the vacuum cleaner back towards the dust extractor.

The high air pressure source can be a canister of compressed gas 792 (see FIG. 32b), a powered compressor 794 (see FIG. 32a) or the vacuum cleaner 782 where the air expelled during the operation of the vacuum cleaner 782 is redirected back towards the suction cup compressor through the air hose 790 (see FIG. 32c).

Figure 32D:
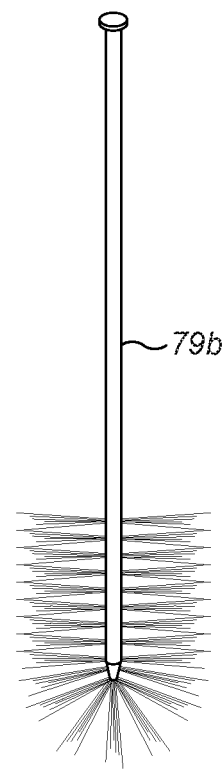
FIG. 32*d* shows a brush.

The pipe 780 is then withdrawn from the collar 12 and the pivotal cover 724 is moved to its second position where it extends away from the collar 12. A brush 796 (see FIG. 32d) can then be inserted through the drill passage 18 and into the hole in the work surface 786. The brush 796 is reciprocatingly moved within the hole of the work piece to loosen any material attached to the wall of the hole.

The brush is then removed from the hole and the collar 12. The pivotal cover 724 is then moved again to and locked in its first position so that the pivotal cover 724 covers the upper entrance of the drill passage 18. The pipe 780 from the high pressure air hose 790 of a high air pressure source 782, 792, 794 is then reinserted through the hole 732 of the pivotal cover 724, through the drill passage 18 and into the hole in the work surface 786. Another jet of high pressure air is then blasted through the pipe 780 and into the hole. Any remaining dust within the hole is forcefully blown out of the hole and into the drill passage 18, the pivotal cover 724 preventing this dust from exiting the drill passage 18 through upper entrance of the drill passage 18 to ensures that it is sucked into the suction cup dust extractor by the vacuum cleaner 782 and then into the vacuum cleaner 784.

A second embodiment of the present invention will now be described with reference to FIG. 31. Where the same features are present in the second embodiment are also present in the first embodiment described above, the same reference numbers have been used. The design of the embodiment is the same as the first embodiment except that the pivotal cover 724 pivots about an axis 900 which extends in a direction parallel to the longitudinal axis of the drill passage 18. The pivotal cover 724 can rotate in the direction of arrow T from a first position where it covers the upper entrance to the drill passage 18 to an extended position (shown in dashed lines) remote from the upper entrance of the drill passage 18. When the pivotal cover 724 is in its first position it locates under the end of a flexible L shaped stop 902 which holds the pivotal cover 724 in its first position. The second embodiment operates in the same manner as the first embodiment.

Figure 30:
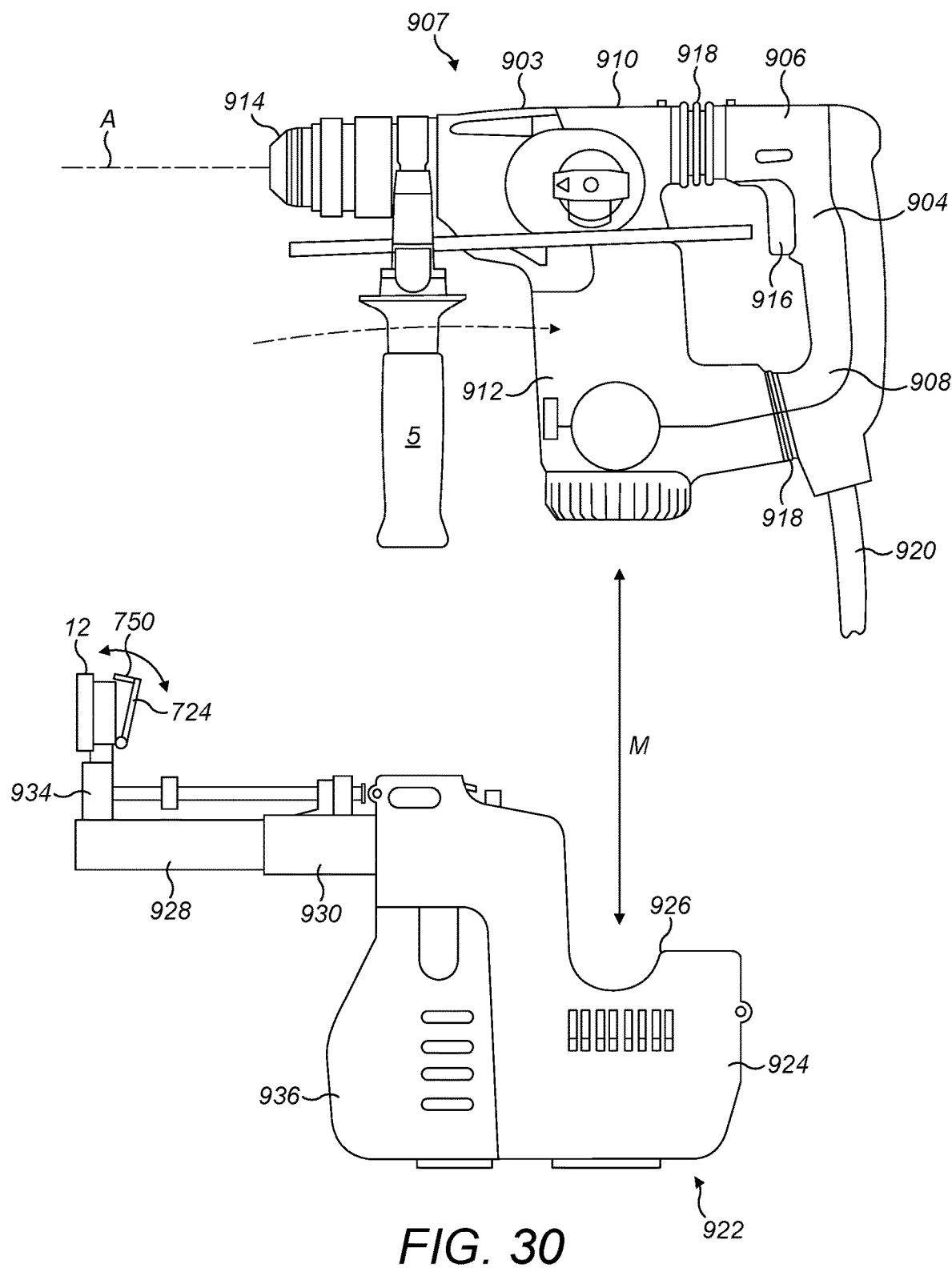
FIG. 30 shows a dust extractor which mounts onto a hammer drill.

Referring to FIG. 30, whilst the drill collars 24 of the first and second embodiments are described in relation to suction cup dust extractors, they can be used on different types of dust extractors such as a dust extractor which mounts on a hammer drill.

FIG. 30 shows a hammer drill onto which a dust extract can be mounted (in the direction of Arrow M). Referring to FIG. 30, a hammer drill comprises a main housing 901 and a rear handle 904 attached to the main housing 901 via vibration dampeners 918 at its upper 906 and lower 908 ends. The main housing 901 comprises a motor housing 912, in which is mounted an electric motor having an output spindle and a transmission housing 910, in which is mounted the hammer mechanism (not shown) and rotary drive (not shown). A mode change knob 903 is used to change the mode of operation of the hammer drill. A tool holder 914 is mounted on the front of the transmission housing 910 which is capably of releasably holding a cutting tool (not shown). The tool holder is cable of being rotated about axis A. A front handle is attached to the transmission housing 910 behind the tool holder 914. A trigger switch 916 is mounted within the rear handle 904 by which an operator can activate the hammer drill. An electric cable 920 connects to the base of the rear handle 904 by which a mains AC electric power supply is supplied to the hammer drill.

A typical dust extractor comprises a main housing 922 manufactured from two plastic clam shells 924, 926 which are joined together about a vertical plane using screws. The main housing 922 can clip onto the motor housing 912 of the hammer drill.

Mounted on the top of the main housing is a telescopic tubular extension arm 928, 930. A first section 928 of the telescopic arm 930 can slide in and out of the other second section 930. A spring (not shown) biases the first section 928 out of the second section towards its maximum extended position.

Mounted on the end of the first section 928 remote from the main housing is a tubular support 934 and a collar 12. A drill passage 18e is formed through the collar 122 to allow a cutting tool to pass through the collar 12.

A dust collection box 936 releaseably connects to the front of the main housing 922. A filter (not shown) is mounted within the box 936. A fan (not shown) mounted in the housing 922 which is rotatably driven by a motor (not shown) to act as a vacuum source to draw air into the collar and through the dust collection box 936.

The new feature of the dust extractor described with reference to FIG. 30 is the design of the collar 12. The collar 12 mounted on the dust extractor shown in FIG. 30 is the same design as the first embodiment described above.

It will be appreciated by persons skilled in the art that the above embodiments have been described by way of example only and not in any limitative sense, and that various alterations and modifications are possible without departure from the scope of the invention as defined by the appended claims.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A collar system for a dust extractor comprising:
a collar including a drill passage extending through the collar and an extension forming an internal passage that connects at one end with the drill passage, the extension being attachable to a housing of the dust extractor to enable the internal passage to connect to a suction passage of the dust extractor; and
a cover mounted adjacent an entrance of the drill passage, the cover being pivotably moveable relative to the collar between a first position where it covers the entrance and a second position where is remote from the entrance, wherein the cover comprises a rigid outer ring sized to rest on the collar in the first position and at least hole that passes through the cover.

2. The collar system of claim 1, wherein the hole in a lengthwise direction is frusto-conical in shape.

3. The collar system of claim 1, wherein the cover comprises
a resiliently deformable washer mounted inside of the outer ring.

4. The collar system of claim 3, wherein resiliently deformable washer has an inner section through which the hole extends and an outer section that surrounds the inner section and connects between the outer ring and the inner section.

5. The collar system of claim 4, wherein a thickness of the inner section is approximately the same as that of the outer ring.

6. The collar system of claim 4, wherein a thickness of the outer section is less than that of the inner section.

7. The collar system of claim 4, wherein the washer comprises plurality of radial ribs formed on the surface of the outer section extending from the inner section radially outwardly to the outer ring.

8. The collar system of claim 4, wherein the inner section comprises a conical funnel attached to one side of the inner section which extends the length of the hole.

9. The collar system of claim 3, wherein the washer is integrally molded onto the ring.

10. The collar system of claim 4, wherein the washer is formed in a one-piece construction.

11. The collar system of claim 1, wherein the cover pivots between its first position and its second position.

12. The collar system of claim 1, wherein the cover is releasably attachable to the collar.

13. The collar system of claim 1, wherein the collar comprises a circular brush located adjacent the entrance of the drill passage which extends radially inwardly.

14. The collar system of claim 1, wherein the cover can be locked in its first position.

15. The collar system of claim 1, wherein the hole is sized to receive a pipe of a high-pressure source therein in the first position of the cover, and wherein the cover is configured to be placed in the second position during a drilling operation to allow passage of a drill bit through the drill passage.

16. A suction cup for a dust extractor for a drill comprising:
a housing;
a drill collar system attached to the housing, the drill collar system including: a collar including a drill passage extending through the collar and an extension forming an internal passage that connects at one end with the drill passage, the extension enabling the internal passage to connect to a suction passage of the dust extractor; and a cover mounted adjacent an entrance of the drill passage, the cover being pivotably moveable relative to the collar between a first position where it covers the entrance and a second position where is remote from the entrance, wherein the cover comprises a rigid outer ring sized to rest on the collar in the first position and at least hole that passes through the cover;
a suction chamber formed by the walls of the housing having an opening and which, in use, locates against a work piece to create a chamber;
at least one aperture located on the housing through which air can pass;
at least one first air passage formed by the walls of the housing that connects between the internal passage of the collar and the at least one aperture to enable air to pass from the internal passage to the at least one aperture; and
at least one second air passage formed within the housing that connects between the suction chamber and the at least one single aperture to enable air to pass from the suction chamber to the at least one aperture.

17. The suction cup of claim 16, wherein the hole is sized to receive a pipe of a high-pressure source therein in the first position of the cover, and wherein the cover is configured to be placed in the second position during a drilling operation to allow passage of a drill bit through the drill passage.

* * * * *